US008862374B2

(12) United States Patent
Maura

(10) Patent No.: US 8,862,374 B2
(45) Date of Patent: Oct. 14, 2014

(54) EVALUATION INDICATION SYSTEM, EVALUATION INDICATION METHOD AND COMPUTER-READABLE STORAGE MEDIUM

(71) Applicant: Masao Maura, Seto (JP)

(72) Inventor: Masao Maura, Seto (JP)

(73) Assignee: Aisin AW Co., Ltd., Anjo (JP)

(*) Notice: Subject to any disclaimer, the term of this patent is extended or adjusted under 35 U.S.C. 154(b) by 0 days.

(21) Appl. No.: 13/654,069

(22) Filed: Oct. 17, 2012

(65) Prior Publication Data
US 2013/0158849 A1 Jun. 20, 2013

(30) Foreign Application Priority Data
Dec. 15, 2011 (JP) .................................. 2011-274390

(51) Int. Cl.
G06F 17/00 (2006.01)
G01C 21/34 (2006.01)
G01C 21/36 (2006.01)

(52) U.S. Cl.
CPC ................................. G01C 21/3697 (2013.01)
USPC ....................................................... 701/123

(58) Field of Classification Search
CPC . B60L 2240/60; B60L 15/2045; G01C 21/00; G01C 21/3469; G01C 21/3697; B60W 20/00; B60W 2550/402; G06Q 10/47; G08G 1/9626; G08G 1/96827
USPC ....................................................... 701/123
See application file for complete search history.

(56) References Cited

U.S. PATENT DOCUMENTS

| 5,627,752 | A  | * | 5/1997  | Buck et al. ...................... 701/36 |
| 6,336,072 | B1 | * | 1/2002  | Takayama et al. ............. 701/400 |
| 6,487,305 | B2 | * | 11/2002 | Kambe et al. .................. 382/113 |
| 6,697,731 | B2 | * | 2/2004  | Takayama et al. ............. 701/516 |
| 6,714,664 | B2 | * | 3/2004  | Kambe et al. .................. 382/113 |
| 6,748,316 | B2 | * | 6/2004  | Takayama et al. ............. 701/428 |
| 6,963,294 | B2 | * | 11/2005 | Kurosawa ................. 340/995.19 |
| 7,305,304 | B2 | * | 12/2007 | Leyton et al. ...................... 702/3 |
| 7,546,206 | B1 | * | 6/2009  | Miller et al. ................... 701/415 |
| 7,720,630 | B1 | * | 5/2010  | Miller et al. ................... 702/150 |
| 7,778,773 | B2 | * | 8/2010  | Yaqub et al. ................... 701/412 |
| 7,809,503 | B2 | * | 10/2010 | Nakamura et al. ............ 701/414 |
| 7,835,859 | B2 | * | 11/2010 | Bill ............................... 701/424 |
| 7,925,426 | B2 | * | 4/2011  | Koebler et al. ................ 701/123 |
| 7,983,837 | B2 | * | 7/2011  | Yamane et al. ................ 701/414 |
| 8,111,172 | B2 | * | 2/2012  | Morimoto et al. ......... 340/932.2 |

(Continued)

FOREIGN PATENT DOCUMENTS

JP A-2009-2847 1/2009

Primary Examiner — Calvin Cheung
Assistant Examiner — Allen E Quillen
(74) Attorney, Agent, or Firm — Oliff PLC

(57) ABSTRACT

Evaluation indication systems, methods, and programs display a current location of a host vehicle together with a map around the current location on a display unit. The systems, methods, and programs acquire a current evaluation that is an evaluation of a fuel efficiency level in a unit section of current travel of the host vehicle and a previous evaluation that is an evaluation of the fuel efficiency level in the unit section of previous travel previous to the current travel. The systems, methods, and programs acquire an achievement difficulty level of a target value of the fuel efficiency level, set on the basis of results of the fuel efficiency levels when a plurality of vehicles have travelled the unit section, and indicate the achievement difficulty level together with the current evaluation and the previous evaluation on the map.

11 Claims, 10 Drawing Sheets

(56) References Cited

U.S. PATENT DOCUMENTS

| | | | |
|---|---|---|---|
| 8,155,868 B1* | 4/2012 | Xing et al. | 701/123 |
| 8,195,386 B2* | 6/2012 | Hu et al. | 701/436 |
| 8,237,744 B2* | 8/2012 | Joachim et al. | 345/660 |
| 8,296,062 B2* | 10/2012 | Yamane et al. | 701/432 |
| 8,467,952 B2* | 6/2013 | Nakamura | 701/409 |
| 8,645,052 B2* | 2/2014 | Pryakhin et al. | 701/123 |
| 8,694,232 B2* | 4/2014 | Kono et al. | 701/123 |
| 2005/0216185 A1* | 9/2005 | Takezaki et al. | 701/200 |
| 2006/0161344 A1* | 7/2006 | Iwahori et al. | 701/211 |
| 2007/0005235 A1* | 1/2007 | Suzuki et al. | 701/200 |
| 2007/0061074 A1* | 3/2007 | Safoutin | 701/211 |
| 2008/0114534 A1* | 5/2008 | Yamazaki et al. | 701/201 |
| 2008/0312814 A1* | 12/2008 | Broadbent et al. | 701/200 |
| 2010/0185471 A1* | 7/2010 | Chen et al. | 705/7 |
| 2010/0274476 A1* | 10/2010 | Kojima et al. | 701/201 |
| 2010/0280750 A1* | 11/2010 | Chen et al. | 701/204 |
| 2011/0060495 A1* | 3/2011 | Kono et al. | 701/33 |
| 2011/0137470 A1* | 6/2011 | Surnilla et al. | 700/282 |
| 2011/0313647 A1* | 12/2011 | Koebler et al. | 701/123 |
| 2012/0179323 A1* | 7/2012 | Profitt-Brown et al. | 701/29.1 |
| 2013/0116870 A1* | 5/2013 | Harty | 701/22 |
| 2013/0176307 A1* | 7/2013 | Tomaru | 345/420 |
| 2013/0179062 A1* | 7/2013 | Yasushi et al. | 701/123 |
| 2013/0218379 A1* | 8/2013 | Filev et al. | 701/22 |
| 2013/0332020 A1* | 12/2013 | Uchihara et al. | 701/22 |
| 2014/0025226 A1* | 1/2014 | Brown et al. | 701/1 |

* cited by examiner

EVALUATION INDICATION SYSTEM, EVALUATION INDICATION METHOD AND COMPUTER-READABLE STORAGE MEDIUM

INCORPORATION BY REFERENCE

The disclosure of Japanese Patent Application No. 2011-274390 filed on Dec. 15, 2011 including the specification, drawings and abstract is incorporated herein by reference in its entirety.

BACKGROUND OF THE INVENTION

The present invention relates to an evaluation indication system, evaluation indication method and computer-readable storage medium that indicate an evaluation of a fuel efficiency level of a vehicle.

DESCRIPTION OF THE RELATED ART

In related arts, various techniques for indication for improving the fuel efficiency of a vehicle have been developed. For example, Japanese Patent Application Publication No. 2009-2847 (JP 2009-2847 A) describes a technique that a target value of fuel efficiency in each link is calculated on the basis of the shape of the link, the target value of a link in which a current location of a vehicle is included is compared with a fuel efficiency at a current point in time and then a travelling performance rank that indicates a target achievement degree is determined. In addition, the travelling performance rank is indicated by color so that a rank can be recognized.

SUMMARY OF THE INVENTION

In the above-described related art, it has not been able to objectively indicate a section in which a driver is to achieve a target. In the above-described related art, a travelling performance rank that indicates a target achievement degree is determined by comparing an actual result of fuel efficiency of a host vehicle with the target value. Thus, it is possible to determine a section for attempting to improve the driving operation on the basis of the fuel efficiency of the host vehicle driven by the driver. An actual result of fuel efficiency of the host vehicle driven by the driver reflects the tendency of driving operation of the driver, but it is significantly influenced by an accidental event (such as traffic congestion, weather, or the like) that is irrelevant to the tendency of driving operation of the driver. Thus, when a section in which the driver is to improve driving operation is indicated on the basis of only an actual result of fuel efficiency of the host vehicle, the indication not always provides an appropriate guideline for actual driving.

The present invention provides an evaluation indication system, evaluation indication method and computer-readable storage medium that are able to objectively indicate a section in which a driver is to achieve of a fuel efficiency level.

A first aspect of the present invention provides an evaluation indication system. The evaluation indication system includes: a guide control unit that displays a current location of a host vehicle and a map around the current location on a display unit; a current evaluation acquisition unit that acquires a current evaluation that is an evaluation of a fuel efficiency level in a unit section of current travel of the host vehicle; a previous evaluation acquisition unit that acquires a previous evaluation that is an evaluation of the fuel efficiency level in the unit section of previous travel previous to the current travel; and an achievement difficulty level acquisition unit that acquires an achievement difficulty level of a target value of the fuel efficiency level, set on the basis of results of the fuel efficiency levels in the case where a plurality of vehicles have travelled the unit section, wherein the guide control unit indicates the achievement difficulty level together with the current evaluation and the previous evaluation on the map.

A second aspect of the present invention provides an evaluation indication method. The evaluation indication method includes: displaying a current location of a host vehicle and a map around the current location on a display unit; acquiring a current evaluation that is an evaluation of a fuel efficiency level in a unit section of current travel of the host vehicle; acquiring a previous evaluation that is an evaluation of the fuel efficiency level in the unit section of previous travel previous to the current travel; acquiring an achievement difficulty level of a target value of the fuel efficiency level, set on the basis of results of the fuel efficiency levels in the case where a plurality of vehicles have travelled the unit section; and indicating the achievement difficulty level together with the current evaluation and the previous evaluation on the map.

A third aspect of the present invention provides a non-transitory computer-readable storage medium that stores computer-executable instructions for performing an evaluation indication function. The evaluation indication function includes: displaying a current location of a host vehicle and a map around the current location on a display unit; acquiring a current evaluation that is an evaluation of a fuel efficiency level in a unit section of current travel of the host vehicle; acquiring a previous evaluation that is an evaluation of the fuel efficiency level in the unit section of previous travel previous to the current travel; acquiring an achievement difficulty level of a target value of the fuel efficiency level, set on the basis of results of the fuel efficiency levels in the case where a plurality of vehicles have travelled the unit section; and indicating the achievement difficulty level together with the current evaluation and the previous evaluation on the map.

With the above-described configurations, it is possible for the driver to easily select a unit section in which it is objectively easy to improve driving operation. In addition, current evaluations are indicated by unit sections. By so doing, it is possible to easily check whether the fuel efficiency level is actually improved in each of the unit sections in which the driver has intended to improve driving operation.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF THE EMBODIMENTS

Figure 1:
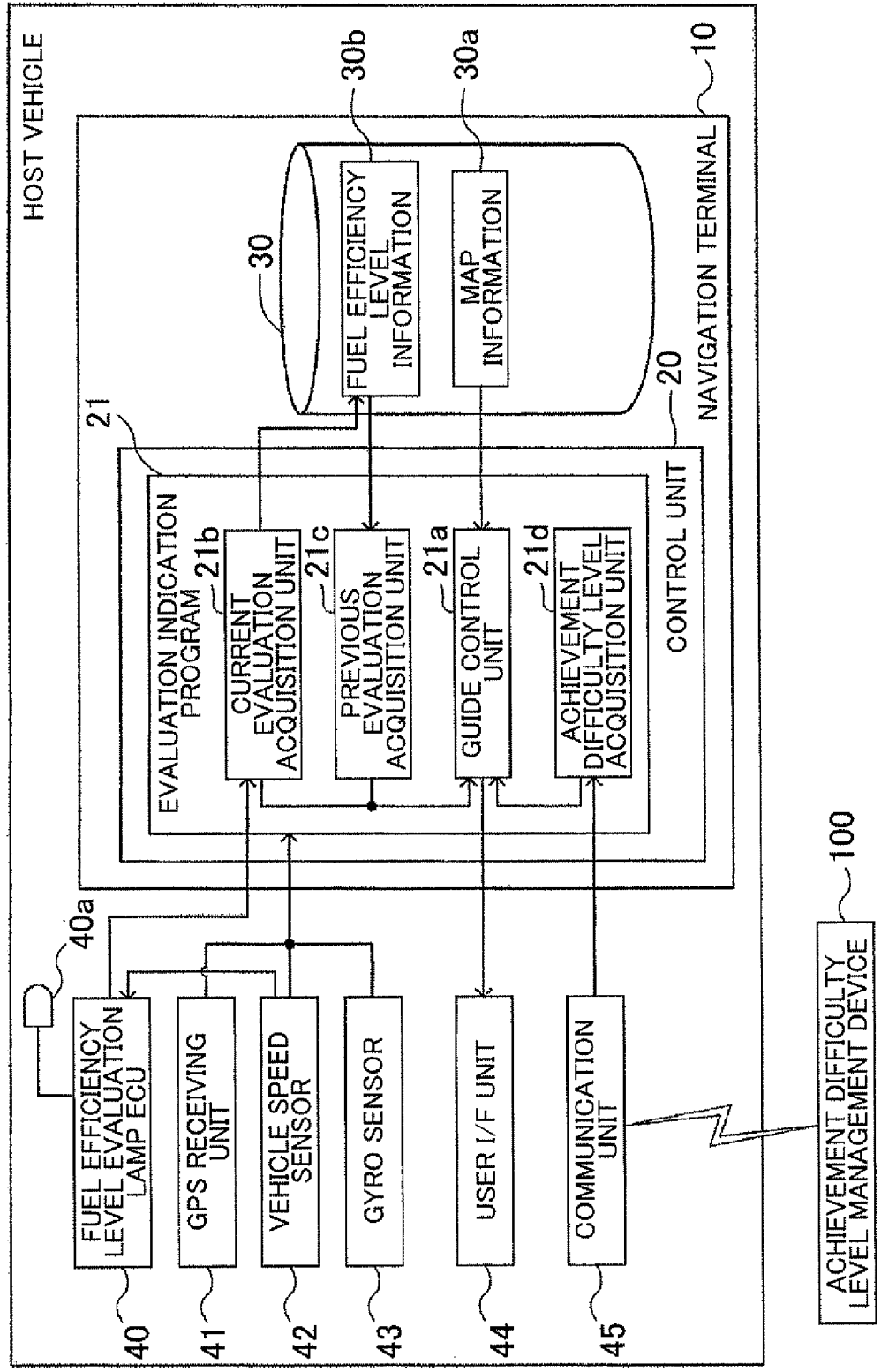
FIG. 1 is a block diagram that shows a navigation terminal that includes an evaluation indication system.

Here, an embodiment of the present invention will be described in accordance with the following sequence.
(1) Configuration of Navigation Terminal
(2) Fuel Efficiency Level Information Acquisition Process
(3) Evaluation Indication Process
(4) Achievement Difficulty Level Determination Process
(5) Alternative Embodiments
(1) Configuration of Navigation Terminal FIG. 1 is a block diagram that shows the configuration of an evaluation indication system mounted on a host vehicle. In the present embodiment, the evaluation indication system is implemented by a navigation terminal 10. The navigation terminal 10 includes a control unit 20 that has a CPU, a RAM, a ROM, and the like. The control unit 20 executes programs stored in the ROM. In the present embodiment, the control unit 20 executes a navigation program that is one of programs stored in the ROM. The navigation program is a program that causes the control unit 20 to implement the function of displaying a map, including a current location of the host vehicle, on a display unit of the navigation terminal 10 and guiding a driver to a destination. The navigation program includes an evaluation indication program 21 that causes the display unit to indicate current evaluations and previous evaluations together by unit sections and to indicate achievement difficulty levels of a target value of fuel efficiency level by unit sections.

The host vehicle according to the present embodiment includes a fuel efficiency level evaluation lamp ECU 40, a GPS receiving unit 41, a vehicle speed sensor 42, a gyro sensor 43, a user I/F unit 44 and a communication unit 45. The GPS receiving unit 41 receives electric waves from GPS satellites and, through an interface (not shown), outputs a signal for calculating a current location of the host vehicle. The control unit 20 acquires the signal output from the GPS receiving unit 41. By so doing, the control unit 20 acquires the current location of the host vehicle. The vehicle speed sensor 42 outputs signals corresponding to the rotation speeds of wheels equipped for the host vehicle. The control unit 20 acquires, via an interface (not shown), the signals output from the vehicle speed sensor 42, and acquires a vehicle speed. The gyro sensor 43 detects an angular acceleration of a turn of the host vehicle in a horizontal plane and outputs a signal corresponding to the direction of the host vehicle. The control unit 20 acquires the signal output from the gyro sensor 43 to acquire the travelling direction of the host vehicle. The vehicle speed sensor 42, the gyro sensor 43, and the like, are utilized to, for example, correct the current location of the host vehicle, determined on the basis of the output signal of the GPS receiving unit 41. In addition, the current location of the host vehicle is corrected on the basis of a travel track of the host vehicle.

The fuel efficiency level evaluation lamp ECU 40 includes a control circuit that is used to evaluate the fuel efficiency level of the travelling host vehicle on the basis of the operation of the host vehicle. A lamp 40a is provided in an instrumental panel of the host vehicle, and is connected to the fuel efficiency level evaluation lamp ECU 40. In the present embodiment, the fuel efficiency level evaluation lamp ECU 40 determines whether a combination of pieces of information coincides with a condition in which fuel consumption is suppressed. The combination of pieces of information corresponds to a combination of information that indicates fuel consumption (for example, information identified from a signal for operating an injector, information indicated by a fuel consumption sensor, and the like), information output from the vehicle speed sensor 42 and information that indicates the state of a transmission. Note that various conditions may be defined as the condition in which fuel consumption is suppressed, and, in the present embodiment, when the consumption amount of fuel is smaller than or equal to a predetermined amount, the vehicle speed is higher than or equal to a predetermined threshold and the state of the transmission is a normal state (the trans mission operates in a drive mode, for example, in which the state of the transmission is not a state for acceleration at high efficiency such as in a sporty mode, or the like), the fuel efficiency level evaluation lamp ECU 40 determines that the combination of the pieces of information coincides with the condition in which fuel consumption is suppressed.

Then, the fuel efficiency level evaluation lamp ECU 40 turns on the lamp 40a when the combination of the pieces of information coincides with the condition in which fuel consumption is suppressed. As a result, when the lamp 40a is turned on, it is possible to determine that the driver is driving such that fuel consumption is suppressed; whereas, when the lamp 40a is turned off, it is possible to determine that the driver is driving such that fuel is excessively consumed. In addition, when the fuel efficiency level evaluation lamp ECU 40 turns on the lamp 40a, the fuel efficiency level evaluation lamp ECU 40 outputs lamp turn-on information, indicating that the lamp 40a is turned on, to the control unit 20. Thus, the control unit 20 is able to determine whether the lamp 40a is turned on or turned off on the basis of the lamp turn-on information.

The user I/F unit 44 is an interface unit that is used to input a driver's command and provide various pieces of information to the driver. The user I/F unit 44 includes a display unit formed of a touch panel display (not shown), an input unit such as a switch, and a voice output unit such as a speaker. The user I/F unit 44 receives a control signal from the control unit 20 and displays an image for providing various guides on the touch panel display. The communication unit 45 includes a circuit that communicates with an achievement difficulty level management device 100 outside the host vehicle. The control unit 20 is able to communicate with the achievement difficulty level management device 100 via the communication unit 45.

Map information 30a is stored in a storage medium 30. The map information 30a includes node data, shape interpolation point data, link data, and the like. The node data indicate the positions, or the like, of nodes corresponding to end points of roads on which the host vehicle travels. The shape interpolation point data indicate the positions, or the like, of shape interpolation points for determining the shape of a road between the nodes. The link data indicate links between the nodes. In addition, in the present embodiment, fuel efficiency level information 30b is stored in the storage medium 30 each time the host vehicle travels. The fuel efficiency level information 30b indicates fuel efficiency levels of the host vehicle. The fuel efficiency level information 30b is information that indicates a rate at which the above-described lamp 40a has been turned on in an intended evaluation section. When the fuel efficiency level information 30b is stored at the time when the vehicle is travelling toward a set destination, information that indicates the destination and a departure place is stored in association with the fuel efficiency level information 30b. The intended evaluation section is a section within a unit section, and is a section that is subjected to evaluation of fuel efficiency level.

The control unit 20 executes the evaluation indication program 21 to cause the display unit of the user I/F unit 44 to display a map together with current evaluations and previous evaluations. In order to execute the above process, the evaluation indication program 21 includes a guide control unit 21a, a current evaluation acquisition unit 21b, a previous evaluation acquisition unit 21c and an achievement difficulty level acquisition unit 21d.

The guide control unit 21a is a program module that causes the control unit 20 to implement the function of displaying a current location of the host vehicle together with a map around the current location on the display unit of the user I/F unit 44, indicating current evaluations and previous evaluations together by unit sections on the map and indicating achievement difficulty levels by unit sections. The control unit 20 determines the current location of the host vehicle on the basis of the signals output from the GPS receiving unit 41, the vehicle speed sensor 42 and the gyro sensor 43, determines the display range of the map around the current location of the host vehicle, and extracts information about roads, facilities, and the like, in the display range from the map information 30a. Then, the control unit 20 outputs, to the display unit of the user I/F unit 44, a control signal for drawing the map that indicates the current location of the host vehicle and roads, facilities, and the like, around the current location. As a result, the display unit of the user I/F unit 44 displays the map that indicates the roads, facilities, and the like, around the current location of the host vehicle together with the current location of the host vehicle.

The current evaluation acquisition unit 21b is a program module that causes the control unit 20 to implement the function of acquiring a current evaluation that is an evaluation of fuel efficiency level for each unit section (in the present embodiment, a section of a set distance (for example, 100 m)) in current travel of the host vehicle. Through the current evaluation acquisition unit 21b, the control unit 20 executes fuel efficiency level information acquisition process (described later) while the host vehicle is travelling, acquires the turn-on rate of the lamp 40a in each unit section as a fuel efficiency level, and stores the turn-on rate in each unit section as the fuel efficiency level information 30b. Current evaluations and previous evaluations are generated on the basis of the fuel efficiency level information 30b.

In the present embodiment, when the driver sets a destination by operating the user I/F unit 44, the function of the navigation program sets the current location of the host vehicle, at the time of setting the destination, as a departure place, searches for a route from the departure place to the destination, and guides the vehicle. Then, when the host vehicle is travelling from the departure place to the destination, travel from the departure place to the destination at present is regarded as current travel. That is, a current travel section that is a section in which the host vehicle has currently travelled is a section from a departure place as a start point to a current position as an end point. A total distance of the current travel section increases as the host vehicle travels until the host vehicle reaches the destination. When the host vehicle has travelled and reached the set destination, the control unit 20 stores, as the fuel efficiency level information 30b, the turn-on rate of the lamp 40a in each of the unit sections from the departure place to the destination in association with the departure place and the destination.

Then, the control unit 20 compares the fuel efficiency levels, indicated by the fuel efficiency level information 30b, with a target value in current travel and acquires the results of comparison as current evaluations through the process executed by the current evaluation acquisition unit 21b. Therefore, the control unit 20 acquires the fuel efficiency level information 30b for each unit section in the current travel section after the host vehicle starts travelling at the departure place until the vehicle reaches the destination. Then, the control unit 20 compares the turn-on rate of the lamp 40a (the rate of distance travelled in a state where the lamp 40a is turned on) in each unit section, indicated by the fuel efficiency level information 30b, with the predetermined rate as the target value. Then, the control unit 20 determines that the current evaluation is "good" when the turn-on rate of the lamp 40a in each unit section is higher than or equal to the predetermined rate, and determines that the current evaluation is "bad" when the turn-on rate is lower than the predetermined rate.

The previous evaluation acquisition unit 21c is a program module that causes the control unit 20 to implement the function of acquiring previous evaluations that indicate evaluations of fuel efficiency level of the host vehicle in previous travel previous to the current travel by unit sections. In the present embodiment, the control unit 20 sets, as travel for which previous evaluations are indicated, previous travel from the same departure place to the same destination as the current travel. Then, the control unit 20 compares the fuel efficiency levels in previous travel, indicated by the fuel efficiency level information 30b, with the target value and acquires the results of comparison as previous evaluations.

Therefore, the control unit 20 acquires the fuel efficiency level information 30b, indicating the turn-on rate of the lamp 40a with which the same departure place and destination as those of the above-described current travel are associated, from the storage medium 30. When the storage medium 30 stores a plurality of pieces of the fuel efficiency level information 30b with which the same departure place and destination as those of the current travel are associated, the control unit 20 may acquire as previous evaluations the fuel efficiency level information 30b having the highest turn-on rate of the lamp 40a (that is, the fuel efficiency level information 30b that indicates the best fuel efficiency level in the past), for example. Then, the control unit 20 compares the turn-on rate of the lamp 40a with the predetermined rate, determines that the previous evaluation is "good" when the turn-on rate of the lamp 40a is higher than or equal to the predetermined rate, and determines that the previous evaluation is "bad" when the turn-on rate is lower than the predetermined rate. Note that, in order to determine whether the departure place and the destination are the same between current travel and previous travel, a predetermined margin is provided at the position of each point and then, for example, when the distance between two points is shorter than or equal to 300 m, the two points may be regarded as the same point.

The achievement difficulty level acquisition unit 21d is a program module that causes the control unit 20 to implement the function of acquiring achievement difficulty levels of the target value of fuel efficiency level by unit sections. Each achievement difficulty level is set on the basis of results of fuel efficiency levels in the case where a plurality of vehicles have travelled a unit section. In the present embodiment, the control unit 20 acquires achievement difficulty levels by unit sections, generated by the achievement difficulty level management device 100. The achievement difficulty level management device 100 acquires results of fuel efficiency levels, transmitted from the plurality of vehicles, via a communication unit (not shown), and executes statistical processing on the basis of the results of the fuel efficiency levels. By so doing, the achievement difficulty level management device 100 determines an index by which a collective behavior of a plurality of vehicles is comparable in each unit section, and regards that the index indicates a difficulty level of achieving a target value of fuel efficiency level. That is, in the achievement difficulty level management device 100, the achievement difficulty level is set such that the achievement difficulty level decreases as the results of fuel efficiency levels of the plurality of vehicles tend to be good and the achievement difficulty level increases as the results of fuel efficiency levels of the plurality of vehicles tend to be bad. By so doing, it is possible to objectively define the achievement difficulty level.

In the present embodiment, the index by which a collective behavior of a plurality of vehicles is comparable in each unit section is the number of target-unachieved vehicles of which the fuel efficiency level has not reached the target value among the plurality of vehicles that have travelled the unit section. The achievement difficulty level management device 100 evaluates the number of the target-unachieved vehicles with the use of the rate of the number of the target-unachieved vehicles within the number of the plurality of vehicles that have travelled the unit section. That is, the achievement difficulty level management device 100 sets an achievement difficulty level such that the achievement difficulty level increases in a stepwise manner as the rate of the unachieved vehicle increases. The achievement difficulty level just needs to indicate difficulty in achieving the target value of fuel efficiency level in each unit section, and, in the present embodiment, three achievement difficulty levels, that is, a low difficulty level, an intermediate difficulty level and a high difficulty level, are set in order of easiness in achieving the target value of fuel efficiency. The details of how to set the achievement difficulty level will be described later.

The control unit 20 specifies a unit section, and, via the communication unit 45, transmits to the achievement difficulty level management device 100 a request to transmit the achievement difficulty level of the specified unit section. When the achievement difficulty level is transmitted from the achievement difficulty level management device 100, the control unit 20 acquires the achievement difficulty level of the specified unit section via the communication unit 45.

In the present embodiment, an evaluation (current evaluation or previous evaluation) and an achievement difficulty level in each unit section are indicated by a single icon. The icon is displayed in a display mode in which it is possible to determine whether the evaluation is good or bad, whether the evaluation is a current evaluation or a previous evaluation, and the achievement difficulty level. The control unit 20 outputs, to the display unit of the user I/F unit 44, a control signal for drawing the icons that indicate evaluations and achievement difficulty levels by unit sections on the map, through the process executed by the guide control unit 21a. In order to indicate the current evaluations and the previous evaluations, the control unit 20 extracts a current travel section and a previous travel section, travelled in previous travel, from the map currently displayed on the display unit of the user I/F unit 44. Then, the control unit 20 determines current evaluations, previous evaluations and achievement difficulty levels by unit sections in the respective current and previous travel sections, and outputs, to the display unit of the user I/F unit 44, a control signal for drawing icons that indicate the current evaluations, the previous evaluations and the achievement difficulty levels on the map. As a result, the display unit of the user I/F unit 44 indicates the current evaluations and the previous evaluations by unit sections.

Figure 6A:
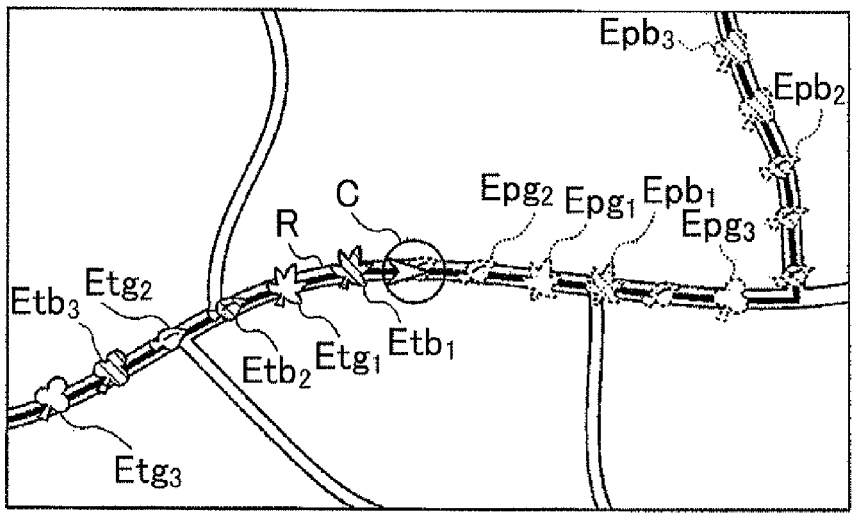
FIG. 6A and FIG. 6D are views that show examples of maps displayed.

FIG. 6A shows an example of a map displayed on the display unit. In this example, an icon C that indicates the current location of the host vehicle is shown on a road R indicated by the solid curve. In addition, in the example shown in FIG. 6A, icons that are shaped like a leaf are used to indicate evaluations of fuel efficiency level on the road. A solid-line icon indicates a current evaluation, a broken-line icon indicates a previous evaluation, a white icon indicates a "good" evaluation, and a hatched icon indicates a "bad" evaluation. Furthermore, an icon shaped like a leaf of maple (hereinafter, referred to as "first shape") indicates a high difficulty level, an icon shaped like a tapered leaf (hereinafter, referred to as "second shape") indicates an intermediate difficulty level, and an icon shaped like a trefoil (hereinafter, referred to as "third shape") indicates a low difficulty level. In FIG. 6A, among the reference signs of icons, Et denotes current evaluation, Ep denotes previous evaluation, Etg and Epg denote "good" evaluations, and Etb and Epb denote "bad" evaluations. In addition, the reference sign indicates the first shape if the suffix numeral is 1, the second shape if the suffix numeral is 2, or the third shape if the suffix numeral is 3.

As shown in FIG. 6A, according to the present embodiment, current evaluations and previous evaluations of unit sections and achievement difficulty levels of the unit sections are indicated on the map displayed on the display unit of the user I/F unit 44 so as to be visually recognizable at the same time. As a result, the driver is able to drive while easily comparing the current evaluations with the previous evaluations. In addition, as in the case of the example shown in FIG. 6A, by indicating the current evaluations and the previous evaluations in different modes (solid line and broke line), the driver is able to clearly distinguish the current evaluations and the previous evaluations from each other without any confusion. Here, the current evaluations and the previous evaluations are indicated by unit sections. In addition, in current travel and in previous travel, the host vehicle usually travels a plurality of unit sections. Therefore, current evaluations and previous evaluations in a plurality of successive unit sections are indicated on the map. Thus, the driver is able to drive while contrasting the current evaluations with the previous evaluations over the plurality of unit sections.

Furthermore, in the present embodiment, each achievement difficulty level is set on the basis of results of fuel efficiency levels in the case where a plurality of vehicles have travelled a corresponding unit section. Thus, it is possible to objectively determine whether the fuel efficiency level tends to reach the target value in each unit section. That is, it is possible to objectively conclude that the achievement difficulty level decreases as the results of fuel efficiency levels of the plurality of vehicles tend to be good and the achievement difficulty level increases as the results of fuel efficiency levels of the plurality of vehicles tend to be bad. In addition, in order for the driver to improve fuel efficiency during travelling by improving driving operation, it is important to improve driving operation in unit sections in which previous evaluations are bad. The unit sections in which the previous evaluations are bad mixedly include sections in which improvement of driving operation is easy and sections in which improvement is difficult. For example, any of icons Epb1 to Epb3 shown in FIG. GA is a "bad" previous evaluation, and the achievement difficulty level increases in order of the unit section of the icon Epb3, the unit section of the icon Epb2 and the unit section of the icon Epb1.

Even when the driver attempts to improve driving operation in a section in which it is difficult to improve driving operation, it often leads to a situation that the fuel efficiency level does not improve at all. In this case, it is conceivable that the driver gradually loses ambition. However, when the driver attempts to improve driving operation in a section in which it is easy to improve driving operation, improvement is achieved one after another, so it is possible to prompt the driver to further diligently attempt to improve fuel consumption. As shown in FIG. 6A, when the achievement difficulty levels of the unit sections in which the previous evaluations are indicated are clearly indicated on the map, the driver is able to easily select the unit section in which it is easy to improve driving operation. For example, in FIG. 6A, the driver is able to make a selection such that the driver does not attempt to improve driving operation in the unit section of the icon Epb1 and attempts to improve driving operation in the unit section of the icon Epb3. Further, as shown in FIG. 6A, current evaluations are indicated by unit sections behind the current location C of the host vehicle. By so doing, it is possible to easily check whether the fuel efficiency level is actually improved in each of the unit sections in which the driver has intended to improve driving operation.

(2) Fuel Efficiency Level Information Acquisition Process

Figure 2:
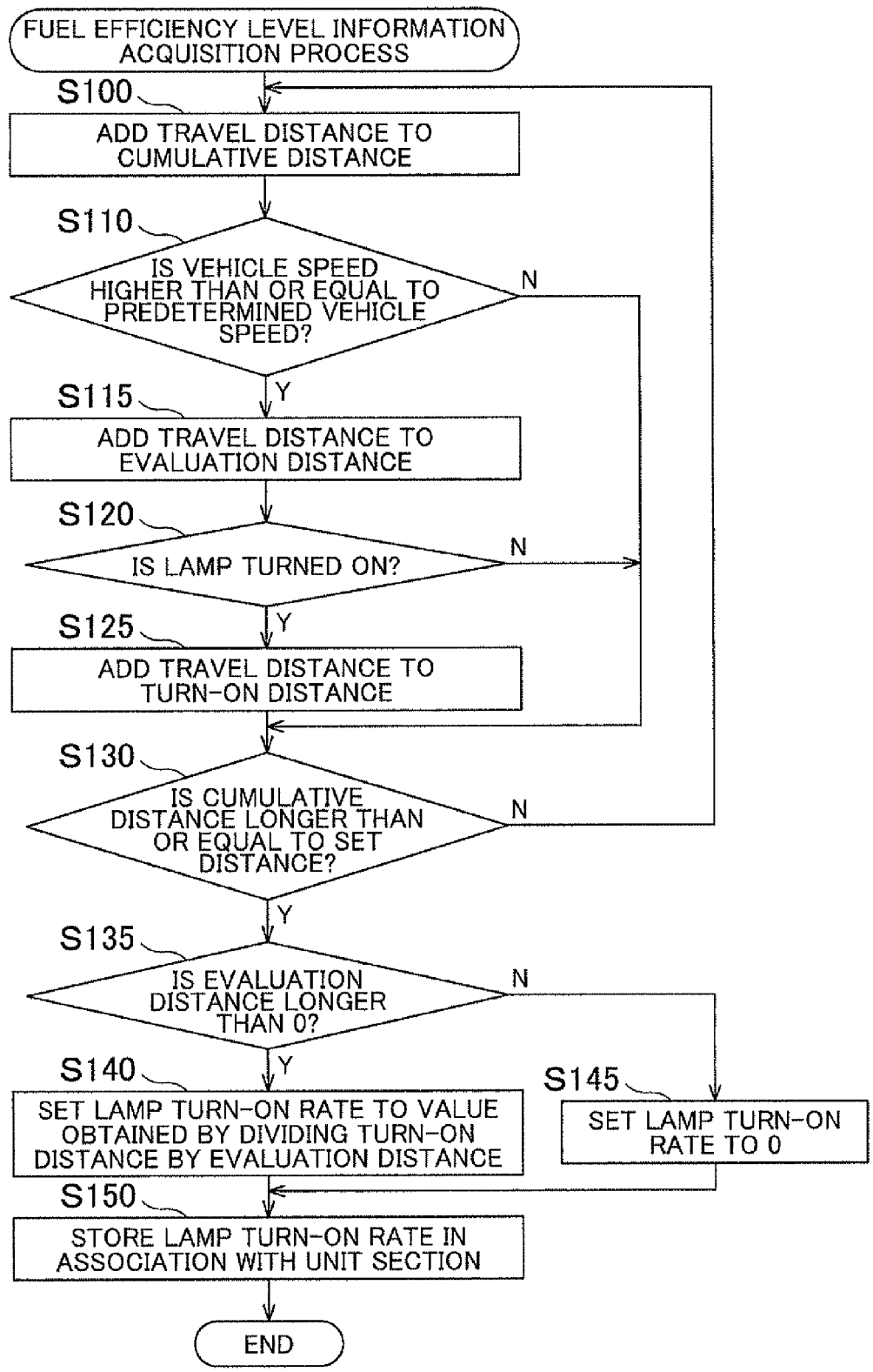
FIG. 2 is a flowchart that shows a fuel efficiency level information acquisition process.

Next, the fuel efficiency level information acquisition process will be described in detail. FIG. 2 is a flowchart of the fuel efficiency level information acquisition process. In the present embodiment, the control unit 20 executes the fuel efficiency level information acquisition process through the process executed by the current evaluation acquisition unit 21b after the vehicle starts travelling toward a set destination. Before the fuel efficiency level information acquisition process is executed, the control unit 20 initializes a variable that indicates a cumulative distance for determining whether the host vehicle has travelled a set distance defined as the length of a unit section, a variable that indicates an evaluation distance for determining a distance that an evaluation of fuel efficiency level is allowed within each unit section and a variable that indicates a turn-on distance for determining a distance that the host vehicle has travelled in a state where the lamp 40a is turned on.

The control unit 20 adds a travel distance to the cumulative distance (step S100). In the present embodiment, steps S100 to S130 form a loop process, and the process of step S100 is executed at a set interval (for example, 100 ms) when the loop process is repeated. Then, the control unit 20 determines a travel distance ΔL that the host vehicle has travelled during a period from when step S100 is previously executed to when step S100 is currently executed on the basis of the signals output from the GPS receiving unit 41, the vehicle speed sensor 42 and the gyro sensor 43, and adds the travel distance ΔL to the cumulative distance. That is, the control unit 20 executes adding process such that a value that indicates a total distance that the host vehicle has travelled during a period in which steps S100 to S130 are repeated becomes the cumulative distance.

Subsequently, the control unit 20 determines whether the vehicle speed is higher than or equal to a predetermined vehicle speed (step S110), and, when it is not determined that the vehicle speed is higher than or equal to the predetermined vehicle speed, the control unit 20 skips steps S115 to S125. On the other hand, in step S110, when it is determined that the vehicle speed is higher than or equal to the predetermined vehicle speed, the control unit 20 adds the travel distance to the evaluation distance (step S115). That is, the above-described travel distance ΔL added to the cumulative distance in step S100 is added to the evaluation distance.

Here, the predetermined vehicle speed that is a determination condition used in determination of step S110 just needs to be defined in advance as a vehicle speed (for example, 4 km/h) below which a significant evaluation of fuel efficiency level cannot be performed. That is, when the vehicle speed is excessively low, it is difficult to distinguish driving operation for suppressing fuel consumption and driving operation for excessively consuming fuel from each other, so the fuel efficiency level is not evaluated in the case where the vehicle speed is lower than the predetermined vehicle speed. Thus, in the present embodiment, when the vehicle speed is lower than the predetermined vehicle speed, it is considered that a significant evaluation of fuel efficiency level cannot be performed and then step S115 is not executed; whereas, when the vehicle speed is higher than or equal to the predetermined vehicle speed, it is considered that a significant evaluation of fuel efficiency level can be performed and then the evaluation distance is increased by the travel distance ΔL in step S115. Note that the predetermined vehicle speed may be equal to a predetermined threshold of vehicle speed, set as one of conditions used when the fuel efficiency level evaluation lamp ECU 40 turns on the lamp 40a.

Furthermore, the control unit 20 determines whether the lamp 40a is turned on (step S120), and, when it is not determined that the lamp 40a is turned on, skips step S125. On the other hand, in step S120, when it is determined that the lamp 40a is turned on, the control unit 20 adds the travel distance to the turn-on distance (step S125). That is, when a significant evaluation of fuel efficiency level can be performed and the lamp 40a is turned on, the control unit 20 adds the above-described travel distance ΔL, added to the cumulative distance in step S100, to the turn-on distance.

Subsequently, the control unit 20 determines whether the cumulative distance is longer than or equal to a set distance (step S130), and repeats the processes of step S100 and the following steps until it is determined in step S130 that the cumulative distance is longer than or equal to the set distance. That is, when the cumulative distance is longer than or equal to the set distance that is defined in advance as the distance of the unit section, the control unit 20 determines that the host vehicle has travelled the unit section and exits from the loop process of steps S100 to S130.

When it is determined in step S130 that the cumulative distance is longer than or equal to the set distance, the control unit 20 determines whether the evaluation distance is longer than 0 (step S135). That is, it is determined whether there is a section in which a significant evaluation can be performed during the travel of the host vehicle in the unit section. When it is determined in step S135 that the evaluation distance is longer than 0, the control unit 20 sets the turn-on rate of the lamp 40a at a value obtained by dividing the turn-on distance by the evaluation distance (step S140). On the other hand, when it is not determined in step S135 that the evaluation distance is longer than 0, the control unit 20 sets the turn-on rate of the lamp 40a to 0 (step S145). That is, when the evaluation distance (denominator for evaluating the turn-on rate) is not 0, the turn-on rate is calculated on the basis of the turn-on distance and the evaluation distance; whereas, when the evaluation distance is 0, the turn-on rate cannot be calculated because of the definition of the turn-on rate, so the turn-on rate is set to 0. The turn-on rate in the case where the evaluation distance is 0 may be set to be unevaluable, for example.

Subsequently, the control unit 20 stores the turn-on rate of the lamp 40a, set in step S140 or S145, in the storage medium 30 as the fuel efficiency level information 30b in association with the unit section (step S150). According to the above process, it is possible to store the fuel efficiency level information 30b for each unit section in the storage medium 30. When the fuel efficiency level information acquisition process is executed in a state where the destination of the host vehicle is set, the control unit 20 stores information that indicates the destination and the departure place in association with the fuel efficiency level information 30*b* in step S150.

(3) Evaluation Indication Process

Figure 3:
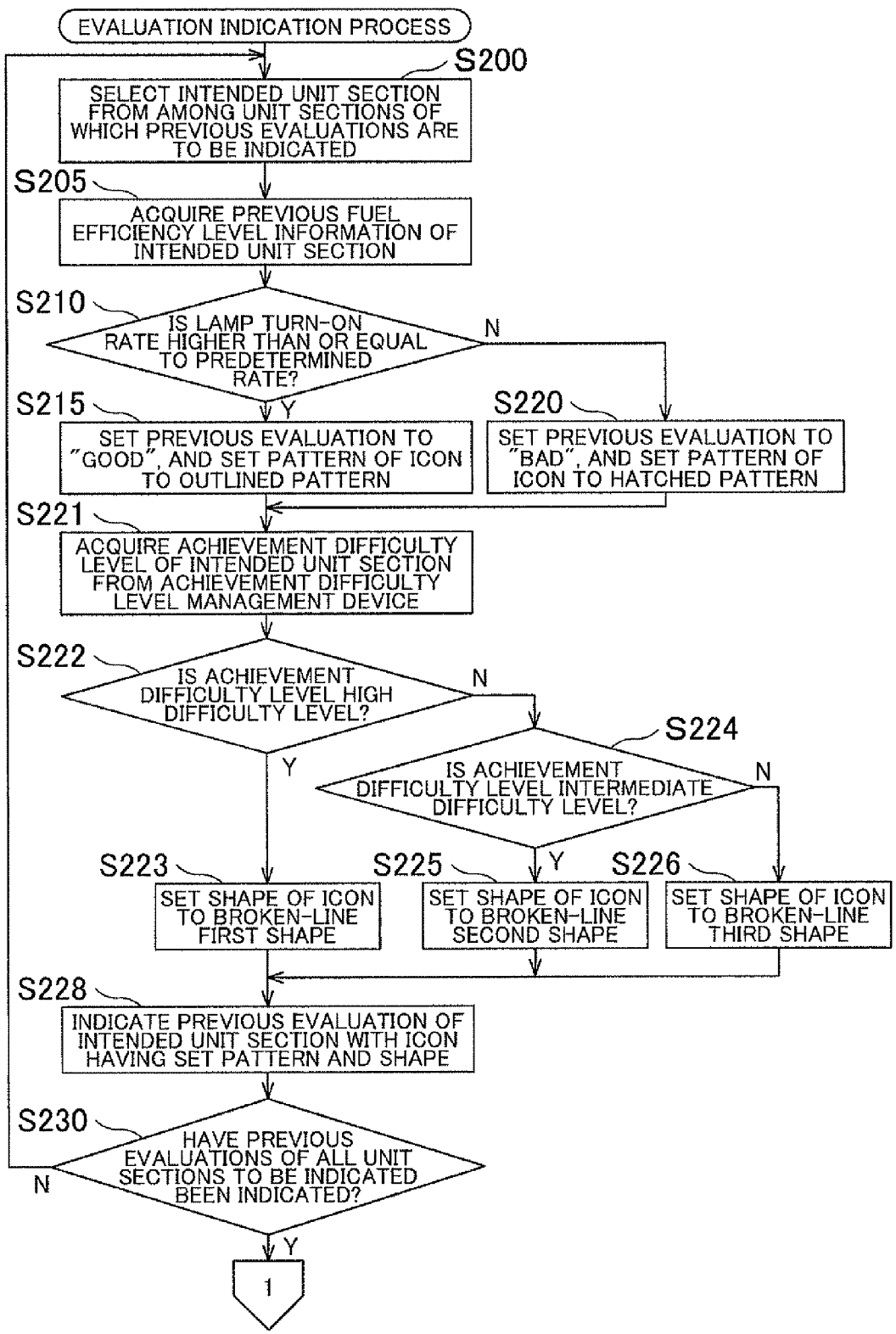
FIG. 3 is a flowchart that shows an evaluation indication process.
Figure 4:
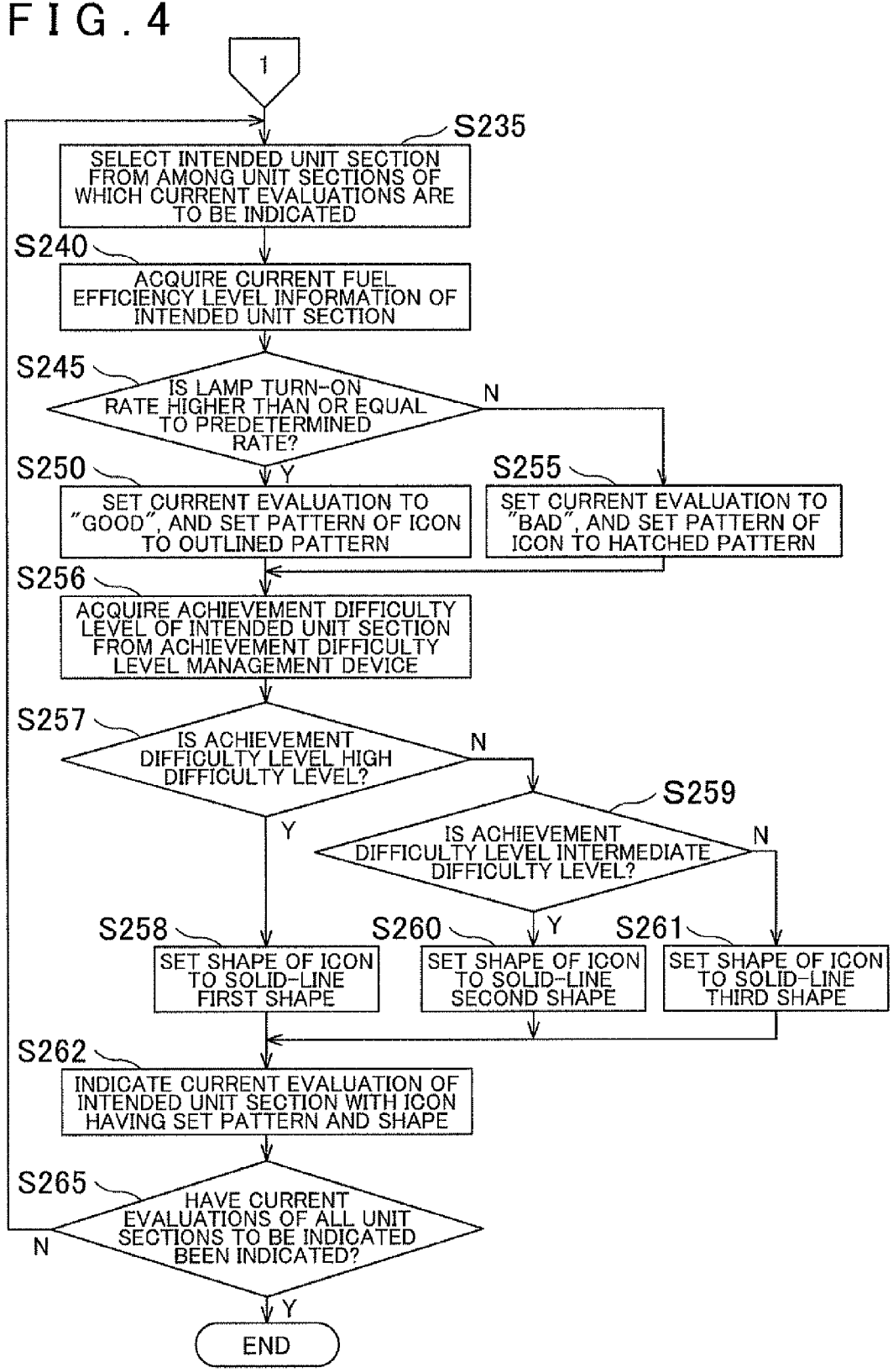
FIG. 4 is a flowchart that shows the evaluation indication process.

Next, the evaluation indication process will be described in detail. FIG. 3 and FIG. 4 are flowcharts of the evaluation indication process. In the present embodiment, the evaluation indication process is executed when a destination is set by the driver and there is the fuel efficiency level information 30*b* for previous travel of which the departure place and destination are the same as the departure place and destination of current travel. In addition, the control unit 20 updates map display on the display unit of the user I/F unit 44 at predetermined intervals. Each time the map display is updated, the evaluation indication process is executed.

Steps S200 to S230 form a loop process for indicating previous evaluations on the map. The control unit 20 initially selects an intended unit section from among unit sections of which previous evaluations are to be indicated through the processes executed by the guide control unit 21*a* and the previous evaluation acquisition unit 21*c* (step S200). Through the process executed by the guide control unit 21*a*, the control unit 20 determines the range of the map displayed on the display unit of the user I/F unit 44. Furthermore, through the process executed by the previous evaluation acquisition unit 21*c*, the control unit 20 extracts the fuel efficiency level information 30*b* having the best fuel efficiency level (the fuel efficiency level information 30*b* of which the turn-on rate of the lamp 40*a* is the largest) from among the pieces of fuel efficiency level information 30*b* associated with the same departure place and destination as the departure place and destination of the current travel. Furthermore, through the process executed by the guide control unit 21*a*, the control unit 20 determines, as the unit sections to be displayed, unit sections included in the range of the map displayed on the display unit of the user I/F unit 44, from among the unit sections associated with the extracted pieces of fuel efficiency level information 30*b*. Then, from among the unit sections to be displayed, any one of the unit sections for which the process of indicating a previous evaluation is not executed is selected as an intended unit section.

Subsequently, the control unit 20 acquires the previous fuel efficiency level of the intended unit section through the process executed by the previous evaluation acquisition unit 21*c* (step S205). That is, the control unit 20 acquires, as the fuel efficiency level, the turn-on rate of the lamp 40*a* in the intended unit section in the previous travel. Subsequently, through the process executed by the previous evaluation acquisition unit 21*c*, the control unit 20 determines whether the fuel efficiency level has reached the target value. That is, the control unit 20 determines whether the turn-on rate of the lamp 40*a* in the intended unit section in the previous travel is higher than or equal to the predetermined rate set in advance as the target value (step S210). When it is determined in step S210 that the turn-on rate of the lamp 40*a* is higher than or equal to the predetermined rate, the control unit 20 sets the previous evaluation of the intended unit section as "good" and sets the pattern of the icon to outlined pattern (step S215), through the process executed by the previous evaluation acquisition unit 21*c*. That is, the control unit 20 sets the pattern of the icon such that the pattern becomes outlined pattern that indicates a "good" evaluation. On the other hand, when it is not determined in step S210 that the turn-on rate of the lamp 40*a* is higher than or equal to the predetermined rate, the control unit 20 sets the previous evaluation of the intended unit section as "bad" and sets the pattern of the icon to hatched pattern (step S220), through the process executed by the previous evaluation acquisition unit 21*c*. That is, the control unit 20 sets the pattern of the icon such that the pattern becomes hatched pattern that indicates a "bad" evaluation.

Subsequently, the control unit 20 acquires the achievement difficulty level of the intended unit section from the achievement difficulty level management device 100 through the process executed by the achievement difficulty level acquisition unit 21*d* (step S221). The control unit 20 outputs to the achievement difficulty level management device 100 a transmission request to transmit the achievement difficulty level of the unit section together with information that indicates the position of the intended unit section to the achievement difficulty level management device 100, via the communication unit 45. When the achievement difficulty level management device 100 acquires the transmission request, the achievement difficulty level management device 100 executes achievement difficulty level determination process (FIG. 5, described later) to determine the achievement difficulty level of the intended unit section, and transmits the information that indicates the achievement difficulty level. The control unit 20 receives the information that indicates the achievement difficulty level via the communication unit 45, and acquires the achievement difficulty level of the intended unit section.

When the achievement difficulty level of the intended unit section is acquired, the control unit 20 determines whether the achievement difficulty level of the intended unit section is a high difficulty level through the process executed by the guide control unit 21*a* (step S222). When it is determined in step S222 that the achievement difficulty level is a high difficulty level, the control unit 20 sets the shape of the icon to the broken-line first shape through the process executed by the guide control unit 21*a* (step S223). That is, the control unit 20 sets the shape of the icon such that the first-shape icon that indicates a high difficulty level is drawn with the broken line that indicates a previous evaluation.

On the other hand, when it is not determined in step S222 that the achievement difficulty level is a high difficulty level, the control unit 20 determines whether the achievement difficulty level of the intended unit section is an intermediate difficulty level through the process executed by the guide control unit 21*a* (step S224). When it is determined in step S224 that the achievement difficulty level is an intermediate difficulty level, the control unit 20 sets the shape of the icon to the broken-line second shape through the process executed by the guide control unit 21*a* (step S225). That is, the control unit 20 sets the shape of the icon such that the second-shape icon that indicates an intermediate difficulty level is drawn with the broken line that indicates a previous evaluation.

Furthermore, when it is not determined in step S224 that the achievement difficulty level is an intermediate difficulty level, the control unit 20 sets the shape of the icon to the broken-line third shape through the process executed by the guide control unit 21*a*. That is, the control unit 20 sets the shape of the icon such that the third-shape icon that indicates a low difficulty level is drawn with the broken line that indicates a previous evaluation (step S226).

Subsequently, the control unit 20 indicates the previous evaluation of the intended unit section with the icon having the set pattern and shape through the process executed by the guide control unit 21*a* (step S228). The control unit 20 outputs to the display unit of the user I/F unit 44 a signal for drawing the icon having the shape set in any one of steps S223, S225 and S226 with the broken line and with the pattern set in any one of steps S215 and S225 at the position of the intended unit section. As a result, the display unit of the user I/F unit 44 displays the icon that corresponds to the previous evaluation and that also indicates the achievement difficulty level of the intended unit section at the position of the intended unit section.

Subsequently, through the process executed by the guide control unit 21*a*, the control unit 20 determines whether the previous evaluations of all the unit sections to be displayed have been indicated (step S230). That is, the control unit 20 determines whether the previous evaluations have been indicated for all the unit sections to be displayed, determined in step S200. In step S230, when it is not determined that the previous evaluations of all the unit sections to be displayed have been indicated, the processes of step S200 and the following steps are repeated. On the other hand, when it is determined in step S230 that the previous evaluations of all the unit sections to be displayed have been indicated, the process for indicating current evaluations is executed in step S235 and the following steps. At the time when the previous evaluations of all the unit sections to be displayed have been indicated, the solid-line icons Etg1 to Etg3 and Etb1 to Etb3 (icons that indicate current evaluations) shown in FIG. 6A have not been displayed yet, and only the broken-line icons Epg1 to Epg3 and Epb1 to Epb3 (icons that indicate the previous evaluations) have been displayed. Note that, when the route is the same between the current travel and the previous travel, previous evaluations are indicated in the unit sections behind the current location of the host vehicle; however, when current evaluations are indicated in the unit sections in which the previous evaluations have been indicated, the current evaluations are preferentially indicated through the processes in step S235 and the following steps.

Steps S235 to S265 form a loop process for indicating current evaluations on the map. Through the processes executed by the guide control unit 21*a* and the current evaluation acquisition unit 21*b*, the control unit 20 initially selects an intended unit section from among unit sections of which current evaluations are to be indicated (step S235). Through the process executed by the guide control unit 21*a*, the control unit 20 determines the range of the map displayed on the display unit of the user I/F unit 44. Furthermore, through the process executed by the current evaluation acquisition unit 21*b*, the control unit 20 determines, as the unit sections to be displayed, the unit sections included in the range of the map displayed on the display unit of the user I/F unit 44 from among the unit sections associated with the pieces of fuel efficiency level information 30*b* stored in the storage medium 30 during the current travel. Then, from among the unit sections to be displayed, any one of the unit sections that have not been subjected to the process of indicating a current evaluation is selected as an intended unit section.

Subsequently, the control unit 20 acquires a current fuel efficiency level of the intended unit section through the process executed by the current evaluation acquisition unit 21*b* (step S240). That is, the turn-on rate of the lamp 40*a* in the intended unit section in the current travel is acquired. Subsequently, the control unit 20 determines whether the turn-on rate of the lamp 40*a* in the intended unit section in the current travel is higher than or equal to the predetermined rate as the target value through the process executed by the current evaluation acquisition unit 21*b* (step S245). When it is determined in step S245 that the turn-on rate of the lamp 40*a* is higher than or equal to the predetermined rate, the control unit 20 sets the current evaluation of the intended unit section as "good" and sets the pattern of the icon to outlined pattern (step S250), through the process executed by the current evaluation acquisition unit 21*b*. In addition, when it is not determined in step S245 that the turn-on rate of the lamp 40*a* is higher than or equal to the predetermined rate, the control unit 20 sets the current evaluation of the intended unit section as "bad" and sets the pattern of the icon to hatched pattern (step S255), through the process executed by the current evaluation acquisition unit 21*b*.

Subsequently, the control unit 20 acquires the achievement difficulty level of the intended unit section from the achievement difficulty level management device 100 through the process executed by the achievement difficulty level acquisition unit 21*d* (step S256). When the achievement difficulty level of the intended unit section is acquired, the control unit 20 determines whether the achievement difficulty level of the intended unit section is a high difficulty level through the process executed by the guide control unit 21*a* (step S257). When it is determined that the achievement difficulty level is a high difficulty level, the control unit 20 sets the shape of the icon to the solid-line first shape (step S258).

On the other hand, when it is not determined in step S257 that the achievement difficulty level is a high difficulty level, the control unit 20 determines whether the achievement difficulty level of the intended unit section is an intermediate difficulty level through the process executed by the guide control unit 21*a* (step S259). When it is determined in step S259 that the achievement difficulty level is an intermediate difficulty level, the control unit 20 sets the shape of the icon to the solid-line second shape through the process executed by the guide control unit 21*a* (step S260). When it is not determined in step S259 that the achievement difficulty level is an intermediate difficulty level, the control unit 20 sets the shape of the icon to the solid-line third shape through the process executed by the guide control unit 21*a* (step S261).

Subsequently, the control unit 20 indicates the current evaluation of the intended unit section with the icon having the set pattern and shape through the process executed by the guide control unit 21*a* (step S262). The control unit 20 outputs to the display unit of the user I/F unit 44 a signal for drawing the icon having the shape set in any one of steps S258, S260 and S261 with the solid line and with the pattern set in any one of steps S250 and S255 at the position of the intended unit section. As a result, the display unit of the user I/F unit 44 displays the icon that corresponds to the current evaluation and that also indicates the achievement difficulty level of the intended unit section at the position of the intended unit section.

Subsequently, through the process executed by the guide control unit 21*a*, the control unit 20 determines whether the current evaluations of all the unit sections to be displayed have been indicated (step S265). That is, the control unit 20 determines whether the current evaluations of all the unit sections to be displayed, determined in step S235, have been indicated. When it is not determined in step S265 that the current evaluations of all the unit sections to be displayed have been indicated, the processes of step S235 and the following steps are repeated. On the other hand, when it is determined in step S265 that the current evaluations of all the unit sections to be indicated have been indicated, the control unit 20 ends the evaluation indication process. In the present embodiment, when the current evaluation is indicated in the unit section in which the previous evaluation has been indicated, the current evaluation is preferentially indicated. Therefore, when the current evaluations of all the unit sections to be indicated have been indicated, the icons Etg1 to Etg3 and Etb1 to Etb3 of the current evaluations are displayed by the solid line in sections in which the host vehicle has travelled before the current location of the host vehicle as in the case of the example shown in FIG. 6A. On the other hand, in the processes of steps S235 to S265, no current evaluation icons are displayed in sections ahead of the current location of the host vehicle. Therefore, the icons Epg1 to Epg3 and Epb1 to Epb3 of the previous evaluations are indicated by the broken line in the sections ahead of the current location of the host vehicle.

(4) Achievement Difficulty Level Determination Process

Figure 5:
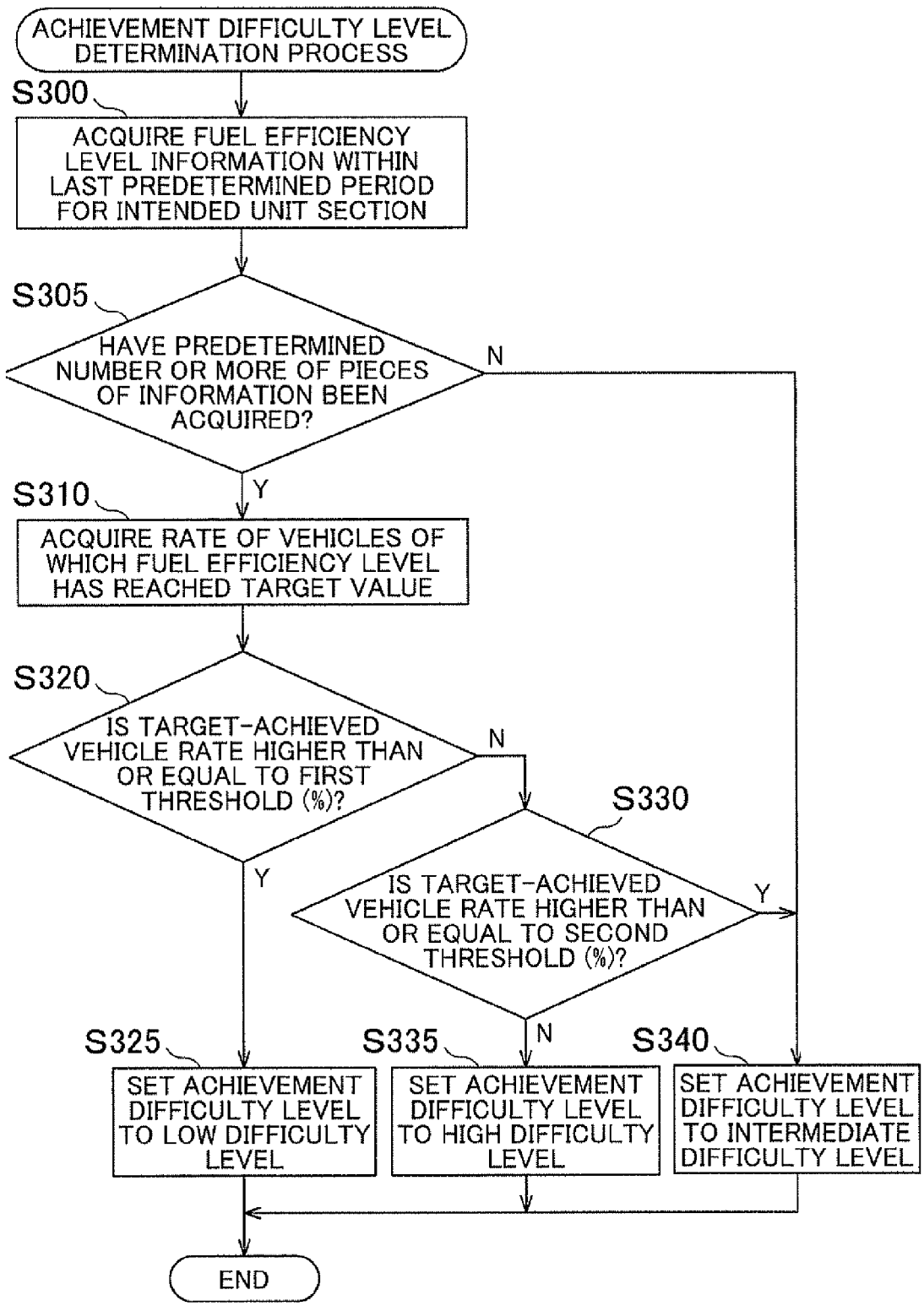
FIG. 5 is a flowchart that shows an achievement difficulty level determination process.

Next, the achievement difficulty level determination process executed by the achievement difficulty level management device 100 will be described in detail. FIG. 5 is a flowchart of an achievement difficulty level determination process. In the present embodiment, when the achievement difficulty level management device 100 receives, from the vehicle, a transmission request to transmit an achievement difficulty level, the achievement difficulty level management device 100 executes the achievement difficulty level determination process shown in FIG. 5. As a precondition, the achievement difficulty level management device 100 receives fuel efficiency level information transmitted from an arbitrary vehicle at an arbitrary timing, and stores the received fuel efficiency level information in a storage medium (not shown). The fuel efficiency level information transmitted from a vehicle is associated with time at which the vehicle has travelled a unit section and information that indicates the position of the unit section.

When the achievement difficulty level determination process is started, the achievement difficulty level management device 100 initially acquires fuel efficiency level information within a last predetermined period for an intended unit section (step S300). That is, the achievement difficulty level management device 100 consults the storage medium to acquire the fuel efficiency level information that is associated with time within the predetermined period before present time and the position of the unit section, specified by the transmission request from the vehicle.

Subsequently, the achievement difficulty level management device 100 determines in step S300 whether a predetermined number or more of pieces of information have been acquired (step S305). That is, the achievement difficulty level management device 100 determines whether a number of pieces of information by which it is possible to ensure predetermined statistical accuracy have been acquired. When it is not determined in step S305 that the predetermined number or more of pieces of information have been acquired, the achievement difficulty level is set to an intermediate difficulty level (step S340). That is, in the present embodiment, a default difficulty level in the case where it is not possible to statistically acquire an achievement difficulty level is set to an intermediate difficulty level.

When it is determined in step S305 that the predetermined number or more of pieces of information have been acquired, the achievement difficulty level management device 100 acquires the rate of vehicles of which the fuel efficiency level has reached the target value (target-achieved vehicle rate) (step S310). That is, the achievement difficulty level management device 100 compares each of the fuel efficiency levels acquired in step S300 with the target value, determines the number of vehicles of which the fuel efficiency level has reached the target value, and then divides the number of vehicles of which the fuel efficiency level has reached the target value by the number of all the vehicles. By so doing, the target-achieved vehicle rate is determined.

Subsequently, the achievement difficulty level management device 100 determines whether the target-achieved vehicle rate is higher than or equal to a first threshold (for example, 70%) (step S320). When it is determined that the target-achieved vehicle rate is higher than or equal to the first threshold, the achievement difficulty level management device 100 sets the achievement difficulty level to a low difficulty level (step S325). On the other hand, when it is not determined in step S320 that the target-achieved vehicle rate is higher than or equal to the first threshold, the achievement difficulty level management device 100 determines whether the target-achieved vehicle rate is higher than or equal to a second threshold (for example, 30%) (the first threshold is larger than the second threshold) (step S330). Then, when it is determined in step S330 that the target-achieved vehicle rate is higher than or equal to the second threshold, the achievement difficulty level management device 100 sets the achievement difficulty level to an intermediate difficulty level (step S340). When it is not determined in step S330 that the target-achieved vehicle rate is higher than or equal to the second threshold, the achievement difficulty level management device 100 sets the achievement difficulty level to a high difficulty level (step S335). Through the above processes, the achievement difficulty level is set so as to be higher, as the rate of target-unachieved vehicles of which the fuel efficiency level has not reached the target value increases.

Figure 6B:
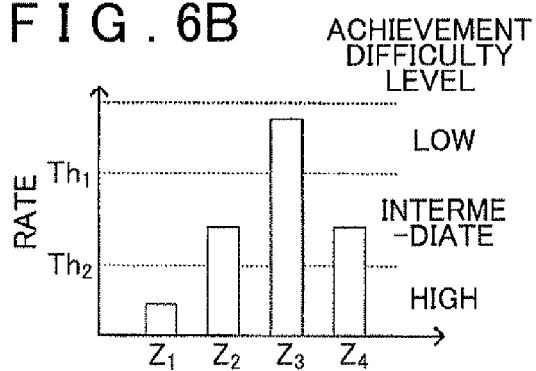
FIG. 6B and FIG. 6C are graphs for illustrating how to set an achievement difficulty level.

FIG. 6B is a bar graph that shows a target-achieved vehicle rate in each of unit sections Z1 to Z4. In FIG. 6B, the target-achieved vehicle rate decreases as the length of the bar graph reduces, and the rate of vehicles of which the fuel efficiency level has not reached the target value (target-unachieved vehicle rate) increases. In FIG. 6B, a first threshold Th1 and a second threshold Th2 for a target-achieved vehicle rate are indicated on the ordinate axis, and achievement difficulty levels are indicated on the right side of the graph. As shown in FIG. 6B, the target-achieved vehicle rate is higher than the first threshold Th1 in the unit section Z3, so the achievement difficulty level is set to a low difficulty level. In the unit sections Z2 and Z4, the target-achieved vehicle rate has not exceeded the first threshold but has exceeded the second threshold Th2, so the achievement difficulty level is set to an intermediate difficulty level. In the unit section Z1, the target-achieved vehicle rate is lower than the second threshold Th2, so the achievement difficulty level is set to a high difficulty level.

(5) Alternative Embodiments

The above-described embodiment is just an example for carrying out the aspect of the present invention, and, as long as each achievement difficulty level is acquired on the basis of results of fuel efficiency levels of a plurality of vehicles, various other embodiments may be employed. For example, the current evaluations and the previous evaluations may be acquired from a device not equipped for the host vehicle, such as an information management center. The achievement difficulty level of each unit section may be prestored as the map information 30a, or the like, in the storage medium 30 of the navigation terminal 10. The navigation terminal 10 may be fixedly mounted on the host vehicle or the portable navigation terminal 10 may be carried into the host vehicle and utilized.

The above-described host vehicle is a host vehicle driven by an internal combustion engine; however, the host vehicle is not limited to such a host vehicle. In a hybrid vehicle or an electric vehicle, current evaluations and previous evaluations may be indicated on a map.

Current evaluations and previous evaluations just need to be indicated so as to be recognized by the driver at the same time on the map. Thus, in one mode, information that directly indicates a current evaluation and a previous evaluation may be indicated. In another mode, information that directly indicates one of a current evaluation and a previous evaluation and information that indirectly indicates the other may be indicated. As for the latter one, for example, it is applicable that one of a current evaluation and a previous evaluation is indicated and information that indicates a relative relationship between the one and the other (such as information that indicates that the other has a better evaluation than the one, the other has a worse evaluation than the one and the other has an equal evaluation to the one) is indicated.

Achievement difficulty levels just need to be indicated such that the achievement difficulty levels are comparable among unit sections. In order to indicate a relationship between an evaluation (a current evaluation or a previous evaluation) and an achievement difficulty level, an icon that indicates an evaluation and achievement difficulty level of the same unit section at the same time may be displayed on the map. That is, current evaluations and previous evaluations may be indicated by icons in modes that correspond to evaluations and that also correspond to achievement difficulty levels. With this configuration, it is possible to recognize an evaluation and an achievement difficulty level for each unit section through a single icon.

A current evaluation just need to be acquired for each unit section at least in a section displayed on the map within a current travel section. In addition, the start point of a current travel section is not specifically limited; when the vehicle has travelled continuously to the current location, the start point of the continuous travel may be set as the start point of the current travel section, and, when the vehicle has travelled discontinuously on different travel dates, or the like, a point at which the vehicle is present before the current location may be set as the start point of a section. That is, a current travel section just needs to be defined so that current travel and previous travel may be distinguished from and contrasted with each other.

A fuel efficiency level is acquired for each unit section, and is stored in a predetermined storage medium for reference. For example, it is only necessary that a fuel efficiency level is acquired each time the vehicle travels a section for which the fuel efficiency level is evaluated and then information (for example, travel date) for identifying travel information, to which the acquired fuel efficiency level is related, in a travel history is stored in the storage medium in association with the fuel efficiency level and the unit section. A current evaluation and a previous evaluation that are determined on the basis of a fuel efficiency level may be stored in the predetermined storage medium.

A fuel efficiency level just needs to be a better evaluation as fuel required for the vehicle to travel a unit distance reduces. The fuel efficiency level may be information that indicates the value of fuel efficiency (for example, information that indicates the average fuel efficiency in a unit section) or may be information that evaluates whether there is driving operation for improving fuel efficiency (for example, information that indicates the frequency of driving operation that contributes to improvement in fuel efficiency).

An evaluation of fuel efficiency level, that is, a current evaluation and a previous evaluation, may be a result of comparison between the fuel efficiency level of the vehicle and a target value and may be an index that contributes to improvement in driving skill. For example, it may be an evaluation that indicates that a fuel consumption has reached the target value or has not reached the target value or may be information that indicates a deviation between a fuel efficiency and a threshold. Furthermore, a target value just needs to indicate a target fuel efficiency level to be achieved. The target value may be a threshold to be compared with a fuel efficiency level. The target value may be a fixed value or a variable value.

Previous evaluations just need to be acquired for a section for which previous evaluations are to be indicated on the map. Specifically, within a previous travel section displayed on the map, a section in which previous evaluations should be contrasted with current evaluations may be set as a section for which previous evaluations are indicated. Here, sections for which previous evaluations are to be indicated may be all or part of the sections having information about a previous evaluation. That is, a previous fuel efficiency level may be regularly determined and may be stored in the storage medium, and previous evaluations of all the unit sections, of which previous fuel efficiency levels are stored in the storage medium and which are present on roads included in the map, may be indicated. Alternatively, previous evaluations in a section to be displayed, selected from among unit sections of which previous fuel efficiency levels are stored in the storage medium, may be determined and indicated.

When a section to be displayed is selected from among unit sections of which previous fuel efficiency levels are stored in the storage medium, previous evaluations for the respective unit sections in previous travel in which the vehicle has travelled a section including the current location may be acquired. That is, previous evaluations are acquired by setting a section that includes the current location as a section for which the previous evaluations are to be indicated. With this configuration, in a state where current evaluations behind the current location are indicated on the map, previous evaluations in a section including the current location are indicated together on the map. Because the section that includes the current location includes a road on which the vehicle travels after the current location, the driver is able to recognize previous evaluations after the current location and, further, drives while contrasting them with current evaluations before the current location.

A fuel efficiency level may be evaluated on the basis of a condition of a combination of a plurality of elements or may be evaluated on the basis of a condition of one element (for example, a value of fuel efficiency). In addition, in a hybrid vehicle that is driven with the use of liquid fuel and a battery, it may be determined that the fuel efficiency level is good in the case where the vehicle is travelling with the use of only a power source of which a unit price for travelling the same distance is cheaper.

A unit section may be a section for leading to the conclusion of an evaluation regarding the fuel efficiency level. A section determined in accordance with a predetermined rule or a section having a set distance may be set as a unit section. For example, one link that has, as end points of the link, the closest nodes indicated by map information may be used as one unit section. A unit section of which a current evaluation is to be indicated and a unit section of which a previous evaluation is to be indicated may coincide with each other or may be different from each other. That is, unit sections just need to be determined in accordance with a common rule, and unit sections to be displayed may be selected where appropriate.

An achievement difficulty level just needs to be a difficulty level at the time of driving a vehicle such that the fuel efficiency level reaches the target value, and may be defined by an accumulated value, or the like, of deviations between resultant values of fuel efficiency levels of a plurality of vehicles and the target value. In addition, a plurality of vehicles over which the fuel efficiency level is analyzed to determine the achievement difficulty level may include the host vehicle or may not include the host vehicle. However, in order to objectively determine the achievement difficulty level, it is desirable to include a vehicle other than the host vehicle. The achievement difficulty level may be acquired in various modes. For example, information that indicates an achievement difficulty level of each unit section may be associated with map information utilized in navigation processing, or the like, or may be acquired through communication from the achievement difficulty level management device.

When an achievement difficulty level is defined on the basis of the number of target-unachieved vehicles of which the fuel efficiency level has not reached the target value, the achievement difficulty level may continuously vary with the number of target-unachieved vehicles. Specifically, the achievement difficulty level may be set so as to increase as the number of target-unachieved vehicles increases. With this configuration, it is possible to define an achievement difficulty level such that the achievement difficulty level decreases as the number of vehicles of which the fuel efficiency level has reached the target value and the achievement difficulty level increases as the number of vehicles of which the fuel efficiency level has reached the target value reduces. The number of target-unachieved vehicles of which the fuel efficiency level has not reached the target value may be evaluated on the basis of the above-described target-achieved vehicle rate (target-unachieved vehicle rate) or may be evaluated on the basis of the number of the target-unachieved vehicles itself.

When the length of unit section is the same but the start point or end point of each unit section is not always the same among a plurality of vehicles, the position of an intended unit section in a vehicle that requests an achievement difficulty level may not coincide with the position of a unit section associated with a fuel efficiency level stored in the achievement difficulty level management device 100. In such a case, for example, it is applicable that an achievement difficulty level of each unit section is determined in the achievement difficulty level management device 100 and, among unit sections for which an achievement difficulty level is determined in the achievement difficulty level management device 100, the achievement difficulty level of the unit section that has the longest distance overlapping with the intended unit section is regarded as the achievement difficulty level of the intended unit section. Other than that, the achievement difficulty level of an intended unit section may be determined by assigning weights to achievement difficulty levels, determined in the achievement difficulty level management device 100, on the basis of the ratio of distances that unit sections, for which the achievement difficulty levels are determined in the achievement difficulty level management device 100, overlap with the intended unit section, and then adding the weighted achievement difficulty levels together. When a factor (for example, intersection) that significantly influences fuel efficiency is included in an intended unit section, an achievement difficulty level of a unit section that includes the factor, among unit sections for which an achievement difficulty level is determined in the achievement difficulty level management device 100, may be set as the achievement difficulty level of the intended unit section. On the other hand, when the factor is not included in an intended unit section, an achievement difficulty level of a last unit section that does not include the factor, among unit sections for which an achievement difficulty level is determined in the achievement difficulty level management device 100, may be set as the achievement difficulty level of the intended unit section.

An achievement difficulty level may be objectively determined on the basis of results of fuel efficiency levels of a plurality of vehicles and may be determined in various modes. For example, an achievement difficulty level may be set so as to be higher with an increase in the driving skill of each of drivers of target-unachieved vehicles that have travelled a unit section and of which the fuel efficiency level has not reached the target value. With this configuration, when it is difficult for a driver having a high driving skill to drive the vehicle such that the fuel efficiency level exceeds the target value in a unit section, it is possible to increase the achievement difficulty level of the unit section. A driver's skill may be defined by various methods. For example, it is applicable that, on the basis of fuel efficiency levels acquired from the same vehicle, the number of unit sections in which the fuel efficiency level has reached the target value in the vehicle and the total number of unit sections that the vehicle has travelled are determined and it is determined that the driving skill of a driver increases as a value obtained by dividing the former by the latter increases. It may be determined that the driving skill continuously varies or varies in a stepwise manner. An achievement difficulty level may be defined in consideration of the number of target-unachieved vehicles in addition to the driving skill of a driver.

Figure 6C:
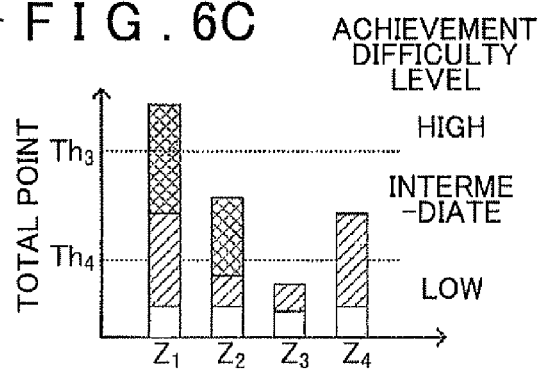

FIG. 6C is a graph for illustrating a configuration that an achievement difficulty level is set so as to increase as a driver's driving skill of each target-unachieved vehicle increases and as the number of target-unachieved vehicles increases. FIG. 6C shows a state where fuel efficiency levels acquired from a plurality of vehicles that have travelled unit sections Z1 to Z4 are analyzed in the achievement difficulty level management device 100.

In this example, the achievement difficulty level management device 100 evaluates the driver's driving skill of each vehicle on the basis of a target achievement rate at which the fuel efficiency level has reached the target value in each vehicle. The achievement difficulty level management device 100 extracts the fuel efficiency levels of unit sections, acquired from the same vehicle, and determines the number of times that the fuel efficiency level has reached the target value in travel of the vehicle and the number of travelled unit sections of the vehicle. Then, the achievement difficulty level management device 100 determines a target achievement rate by dividing the number of times that the fuel efficiency level has reached the target value in travel of the vehicle by the number of travelled unit sections of the vehicle.

Furthermore, the achievement difficulty level management device 100 determines the target achievement rate for each vehicle. The target achievement rate increases as the driver's driving skill of each vehicle increases. Therefore, here, vehicles are classified into three groups in relation to driver's driving skill, on the basis of the target achievement rate. That is, vehicles are classified into a low driving skill group in which the driving skill is a low level that the target achievement rate is higher than 0% and lower than or equal to 10%, an intermediate driving skill group in which the driving skill is an intermediate level that the target achievement rate is higher than 10% and lower than or equal to 90% and a high driving skill group in which the driving skill is a high level that the target achievement rate is higher than 90% and lower than or equal to 100%.

The achievement difficulty level management device 100 sets the score of each group such that the group having a higher driving skill has a higher score, and determines the point of each group by multiplying the score by the rate of target-unachieved vehicles that belong to the corresponding group. Furthermore, the achievement difficulty level management device 100 adds the points of all the groups together to determine the total point of each unit section. That is, in each unit section, the total point is calculated so as to increase as the driver's driving skill of a target-unachieved vehicle increases and to increase as the number of target-unachieved vehicles increases.

For example, 10 points are assigned to the low driving skill group, 40 points are assigned to the intermediate driving skill group and 50 points are assigned to the high driving skill group. Then, the achievement difficulty level management device 100 determines the rate of target-unachieved vehicle in each group as 90% for the low driving skill group, 50% for the intermediate driving skill group and 10% for the high driving skill group. In this case, the total point is 34 (=10×90%+40× 50%+50×10%).

The total point is associated with a threshold in advance. The achievement difficulty level management device 100 determines the achievement difficulty level of the intended unit section as high difficulty level when the total point is higher than or equal to a third threshold Th3, determines the achievement difficulty level of the intended unit section as intermediate difficulty level when the total point is lower than the third threshold Th3 and higher than or equal to a fourth threshold Th4 and determines the achievement difficulty level of the intended unit section as low difficulty level when the total point is lower than the fourth threshold Th4. FIG. 6C shows such an example, and shows total points obtained for respective unit sections Z1 to Z4 in bar graph. As the length of the bar graph increases, the achievement difficulty level increases in a stepwise manner. Note that, in FIG. 6C, outlined portions of the bar graphs indicate the points of the low driving skill group, hatched portions indicate the points of the intermediate driving skill group and cross-hatched portions indicate the points of the high driving skill group. With the above-described configuration, it is possible to objectively determine an achievement difficulty level on the basis of a driver's driving skill of each vehicle.

Not only a guideline for a unit section for attempting to improve driving operation may be provided, but also guidance on a recommended unit section for attempting to improve driving operation. For example, it is applicable that a unit section in which a driver of a host vehicle is to achieve the target value is determined on the basis of the driving skill of the driver of the host vehicle, indicated by a previous evaluation, and guidance on the determined unit section is provided as a recommended unit section. It is possible to evaluate the probability that the fuel efficiency level of each unit section for the driver of the host vehicle in the past has reached the target value or to evaluate a deviation between the fuel efficiency level and the target value, by consulting a previous evaluation. These evaluations correspond to a driver's driving skill. In addition, it is difficult to improve driving operation unless a unit section has a lower achievement difficulty level as a driver has a lower driving skill. Then, a unit section in which the driver is to achieve the target value is determined on the basis of a driving skill, and guidance on the determined unit section is provided as a recommended unit section. By so doing, it is possible to appropriately set a recommended unit section and provide guidance on the recommended unit section for each driver.

Guidance on a recommended unit section may be provided by voice or indication on the display unit. When a recommended unit section is indicated on the display unit, the recommended unit section may be highlighted. For example, among icons that indicate current evaluations, previous evaluations and achievement difficulty levels by unit sections, an icon for a recommended unit section may be highlighted so as to be distinguished from the other icons.

Figure 7:
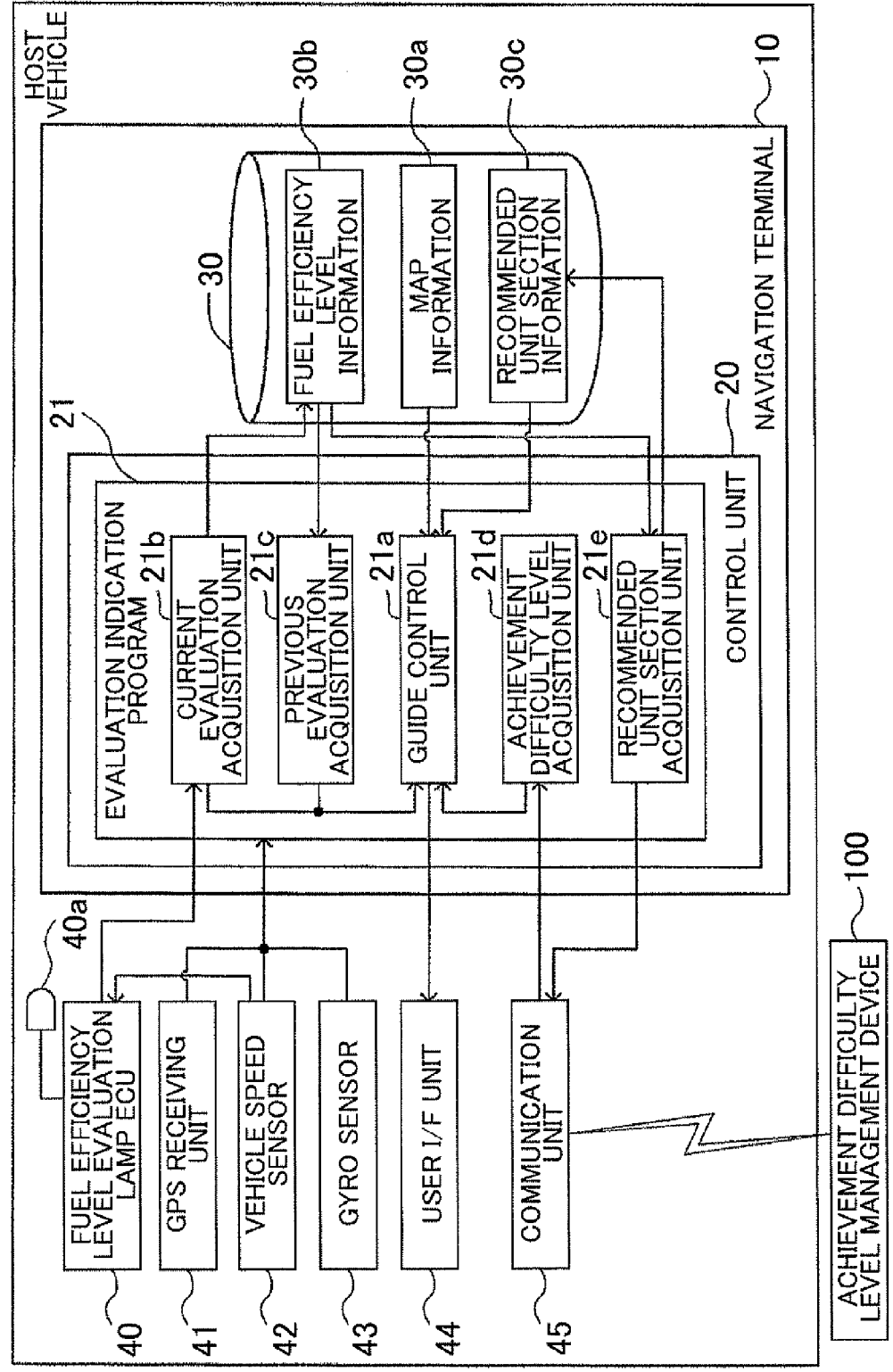
FIG. 7 is a block diagram that shows a navigation terminal that includes an evaluation indication system.
Figure 8A:
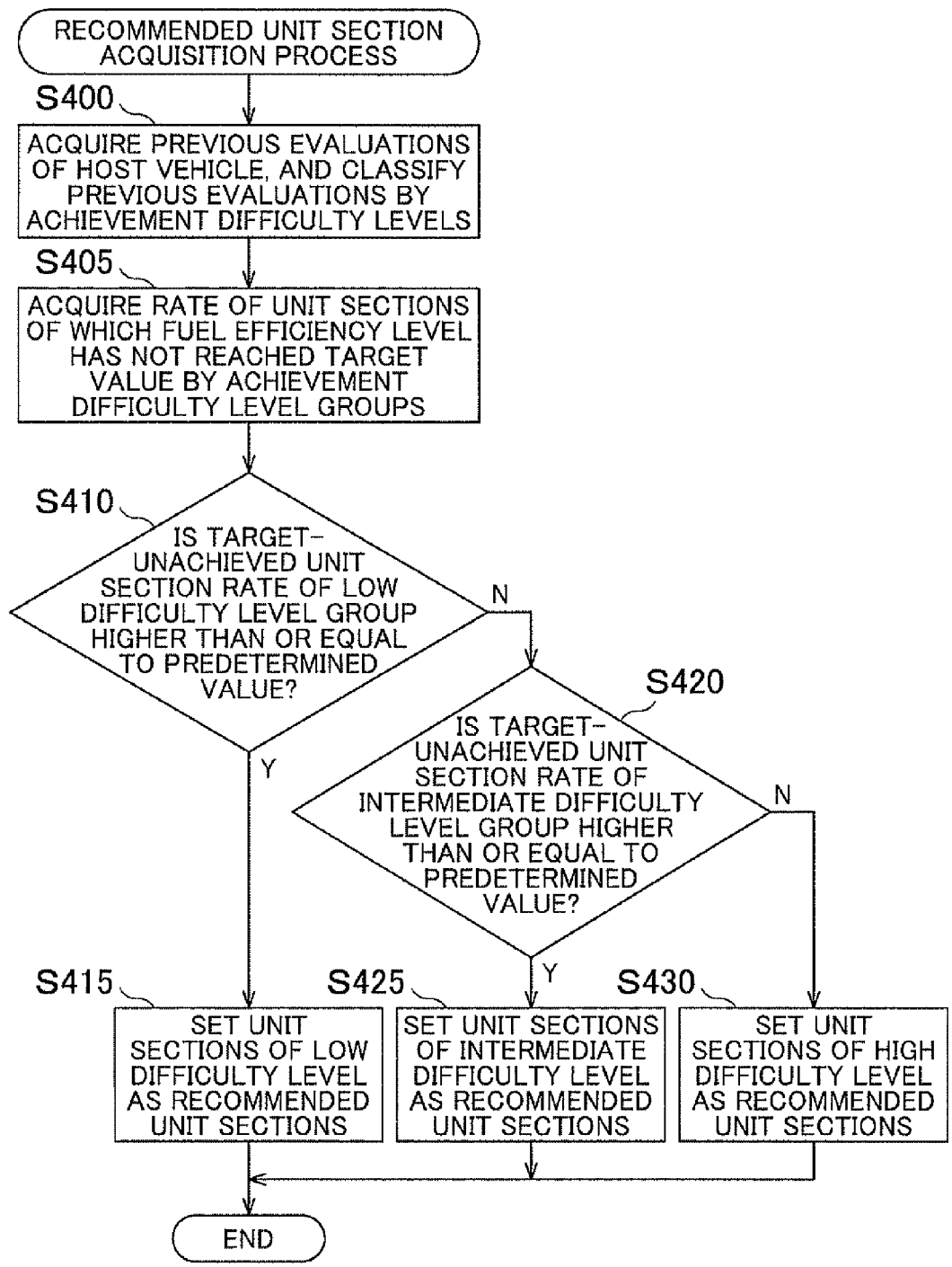
FIG. 8A is a flowchart that shows a recommended unit section acquisition process.

An embodiment for determining a recommended unit section will be described. In this embodiment, first, on the basis of previous evaluations, the rate of unit sections in which the fuel efficiency level of the driver of the host vehicle has not reached the target value among unit sections having the same achievement difficulty level is determined for each achievement difficulty level. Then, the lowest difficulty level among the achievement difficulty levels of which the determined rate is higher than or equal to a predetermined value is determined, and unit sections of the lowest difficulty level are set as recommended unit sections. FIG. 7 shows the configuration of a navigation terminal according to the present embodiment. FIG. 8A is a flowchart that shows a recommended unit section acquisition process for setting a recommended unit section.

The configuration of the navigation terminal and achievement difficulty level management device 100 shown in FIG. 7 is substantially similar to the configuration shown in FIG. 1, and differs from the configuration shown in FIG. 1 in that the evaluation indication program 21 includes a recommended unit section acquisition unit 21*e* and recommended unit section information 30*c* is stored in the storage medium 30. In addition, the processes executed by the evaluation indication program 21 are also substantially similar to the processes shown in FIG. 2 to FIG. 5; however, the configuration shown in FIG. 7 differs from the configuration shown in FIG. 1 in how to set an icon in the evaluation indication process shown in FIG. 3.

The recommended unit section acquisition unit 21*e* is a program module that causes the control unit 20 to implement the function of determining, on the basis of a driving skill of the driver of the host vehicle indicated by previous evaluations, unit sections that a driver of a host vehicle is to achieve a target value, and acquiring the determined unit sections as recommended unit sections. Through the process executed by the recommended unit section acquisition unit 21*e*, the control unit 20 executes the recommended unit section acquisition process shown in FIG. 8A at predetermined intervals and stores the recommended unit section information 30*c* in the storage medium 30.

In the recommended unit section acquisition process, the control unit 20 acquires previous evaluations of the host vehicle, and classifies the previous evaluations by achievement difficulty levels (step S400). Through the process executed by the recommended unit section acquisition unit 21*e*, the control unit 20 consults the fuel efficiency level information 30*a* and acquires the turn-on rate of the lamp 40*a*, which is the fuel efficiency level, for all the unit sections that the host vehicle has travelled. Then, the control unit 20 sets the previous evaluation as "good" when the turn-on rate is higher than or equal to the predetermined rate as the target value, and sets the previous evaluation as "bad" when the turn-on rate is lower than the predetermined rate. In addition, the control unit 20 outputs a transmission request to transmit achievement difficulty levels of the specified unit sections via the communication unit 45 through the process executed by the recommended unit section acquisition unit 21*e*. As a result, the achievement difficulty levels of the specified unit sections are transmitted from the achievement difficulty level management device 100. The control unit 20 sets the received achievement difficulty levels as the achievement difficulty levels of the unit sections for which a transmission request is issued. Thus, the previous evaluations and the achievement difficulty levels are determined by unit sections. Here, the control unit 20 classifies the unit sections into a group of which the achievement difficulty level is a low difficulty level, a group of which the achievement difficulty level is an intermediate difficulty level and a group of which the achievement difficulty level is a high difficulty level.

Subsequently, the control unit 20 acquires the rate of unit sections of which the fuel efficiency level has not reached the target value (target-unachieved unit section rate) for each achievement difficulty level group through the process executed by the recommended unit section acquisition unit 21e (step S405). That is, the control unit 20 executes, for each group, the process of dividing the number of unit sections of which the previous evaluation is a "bad" evaluation by the number of all the unit sections (the sum of the number of unit sections having a "good" evaluation and the number of unit sections having a "bad" evaluation) within the group having the same achievement difficulty level. By so doing, the control unit 20 acquires the target-unachieved unit section rate for each achievement difficulty level group.

Subsequently, the control unit 20 determines whether the target-unachieved unit section rate of the low difficulty level group is higher than or equal to the predetermined value through the process executed by the recommended unit section acquisition unit 21e (step S410). When it is determined in step S410 that the target-unachieved unit section rate of the low difficulty level group is higher than or equal to the predetermined value, the control unit 20 sets the unit sections of the low difficulty level as recommended unit sections through the process executed by the recommended unit section acquisition unit 21e (step S415). On the other hand, when it is not determined in step S410 that the target-unachieved unit section rate of the low difficulty level group is higher than or equal to the predetermined value, the control unit 20 determines whether the target-unachieved unit section rate of the intermediate difficulty level group is higher than or equal to the predetermined value through the process executed by the recommended unit section acquisition unit 21e (step S420). When it is determined in step S420 that the target-unachieved unit section rate of the intermediate difficulty level group is higher than or equal to the predetermined value, the control unit 20 sets the unit sections of the intermediate difficulty level as recommended unit sections through the process executed by the recommended unit section acquisition unit 21e (step S425). When it is not determined in step S420 that the target-unachieved unit section rate of the intermediate difficulty level group is higher than or equal to the predetermined value, the control unit 20 sets the unit sections of the high difficulty level as recommended unit sections through the process executed by the recommended unit section acquisition unit 21e (step S430). Information that indicates the set recommended unit sections is stored in the storage medium 30 as the recommended unit section information 30c.

In this way, in steps S410 and S420, determination as to the low difficulty level is performed first and determination as to the intermediate difficulty level is performed subsequently, and determination is performed in order from lower achievement difficulty level. Thus, through the above-described processes, among the achievement difficulty levels of which the target-unachieved unit section rate is higher than or equal to the predetermined value, the unit sections of the lowest achievement difficulty level are set as recommended unit sections. For a certain achievement difficulty level, when a rate of the unit sections of which the fuel efficiency level has reached the target value is higher than or equal to the predetermined value, it may be regarded that, even when improvement in driving operation is intended in the unit sections of the achievement difficulty level, it does not lead to efficient improvement in fuel efficiency. On the other hand, when there are a plurality of achievement difficulty levels of which the rate of unit sections of which the fuel efficiency level has not reached the target value is higher than or equal to the predetermined value, it is better to improve driving operation in the unit sections of which the achievement difficulty level is the lowest among the plurality of achievement difficulty levels in order to efficiently and easily improve fuel consumption.

Thus, if the unit sections of which the achievement difficulty level is the lowest among the achievement difficulty levels of which the target-unachieved unit section rate is higher than the predetermined value are set as recommended unit sections, it is possible to set the unit sections, in which the driver is able to relatively easily improve fuel efficiency, as recommended unit sections.

Figure 8B:
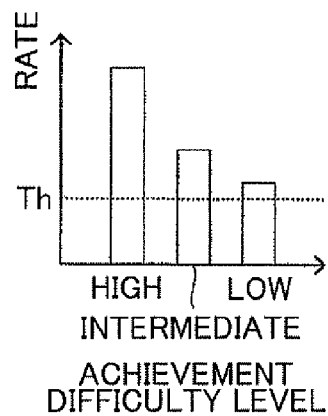
FIG. 8B, FIG. 8C and FIG. 8D are graphs for illustrating how to set a recommended unit section.
Figure 8C:
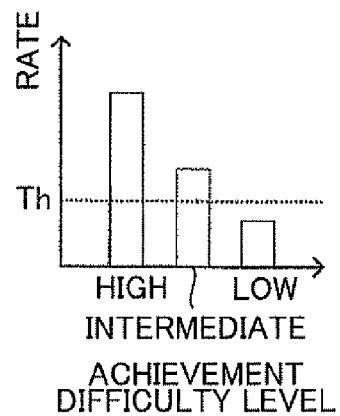
Figure 8D:
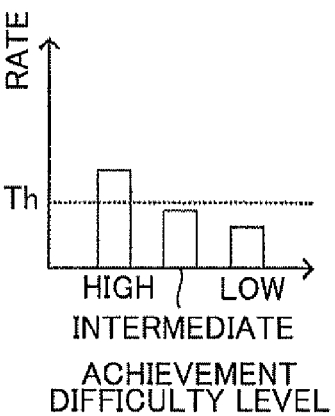

For example, FIG. 8B, FIG. 8C and FIG. 8D are examples in which the target-unachieved unit section rates are indicated by bar graphs by achievement difficulty level groups, together with a predetermined value Th. In FIG. 8B, for all the achievement difficulty levels, the target-unachieved unit section rate is higher than the predetermined value. Thus, the unit sections of the low difficulty level are set as recommended unit sections. In FIG. 8C, for the high difficulty level and the intermediate difficulty level, the target-unachieved unit section rate is higher than or equal to the predetermined value. On the other hand, the target-unachieved unit section rate for the low difficulty level is lower than the predetermined value. Thus, the unit sections of the intermediate difficulty level are set as recommended unit sections. In FIG. 8D, for only the high difficulty level, the target-unachieved unit section rate is higher than or equal to the predetermined value. Thus, the unit sections of the high difficulty level are set as recommended unit sections.

Figure 9:
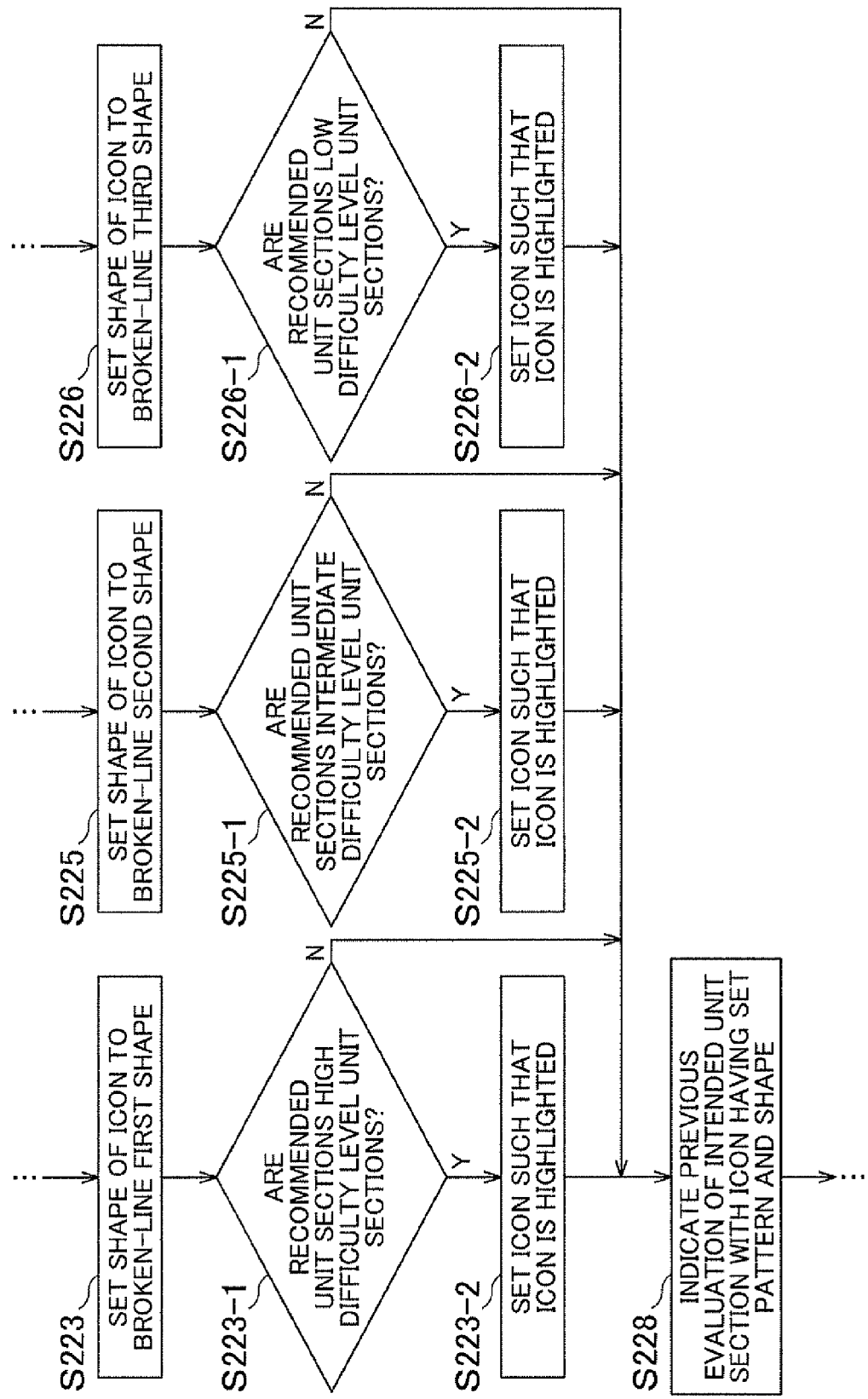
FIG. 9 is a flowchart that shows an evaluation indication process.

In the present embodiment, after the recommended unit sections are set as described above, the process that adds the process of highlighting the recommended unit sections to the evaluation indication process shown in FIG. 3 is executed, and thereby guidance on the recommended unit sections is provided. FIG. 9 is a flowchart that shows the process that is added to the evaluation indication process shown in FIG. 3, and the added process includes steps S223-1, S223-2, S225-1, S225-2, S226-1, S226-2 and part of S228. Steps S223, S225, S226, the process before these steps and the process after step S228 are similar to those of FIG. 3.

When the control unit 20 executes the process shown in FIG. 3 and executes step S223 during the process, the control unit 20 further consults the recommended unit section information 30c to determine whether the recommended unit sections are unit sections of the high difficulty level, through the process executed by the guide control unit 21a (step S223-1). When it is determined in step S223-1 that the recommended unit sections are unit sections of the high difficulty level, the control unit 20 sets, through the process executed by the guide control unit 21, a the icon such that the icon is highlighted (step S223-2). When it is not determined in step S223-1 that the recommended unit sections are unit sections of the high difficulty level, step S223-2 is skipped.

The same applies to the intermediate difficulty level and the low difficulty level. When step S225 is executed during the process shown in FIG. 3, the control unit 20 consults the recommended unit section information 30c and determines whether the recommend unit sections are unit sections of the intermediate difficulty level, through the process executed by the guide control unit 21a (step S225-1). When it is determined in step S225-1 that the recommended unit sections are unit sections of the intermediate difficulty level, the control unit 20 sets, through the process executed by the guide control unit 21a, the icon such that the icon is highlighted (step S225-2). When it is not determined in step S225-1 that the recommended unit sections are unit sections of the intermediate difficulty level, step S225-2 is skipped.

When step S226 is executed in process of the process shown in FIG. 3, the control unit 20 consults the recommended unit section information 30c and determines whether the recommended unit sections are unit sections of the low difficulty level, through the process executed by the guide control unit 21a (step S226-1). When it is determined in step S226-1 that the recommended unit sections are unit sections of the low difficulty level, the control unit 20 sets, through the process executed by the guide control unit 21a, the icon such that the icon is highlighted (step S226-2). When it is not determined in step S226-1 that the recommended unit sections are unit sections of the low difficulty level, step S226-2 is skipped.

Figure 6D:
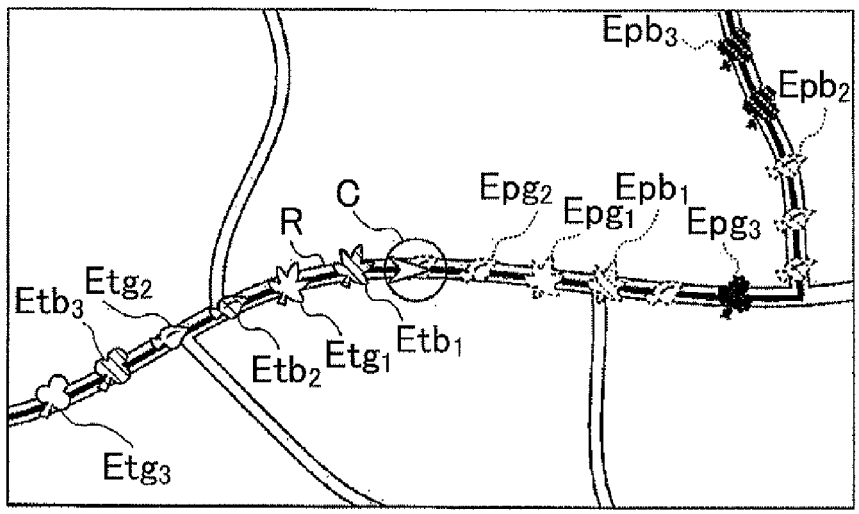

In the case where the icon is set so as to be highlighted in any one of steps S223-2, S225-2 and S226-2, when the icon that indicates the previous evaluation of the intended unit section is displayed in step S228, the control unit 20 highlights the icon through the process executed by the guide control unit 21a. FIG. 6D shows a state where, in the icons similar to those of FIG. 6A, the icons Epb3 and Epg3 for the unit sections of the low difficulty level are highlighted by being blackened. When the driver of the host vehicle attempts to improve driving operation in the unit sections, in which the highlighted icons are displayed, on the basis of such indication, it is possible to relatively easily improve fuel consumption.

Other various methods may be employed as a method of selecting a recommended unit section. For example, it is applicable that target-unachieved unit section rates are determined to set, as recommended unit sections, unit sections having the lowest achievement difficulty level among the achievement difficulty levels of which the target-unachieved unit section rate is higher than or equal to the predetermined value and unit sections having a further lower achievement difficulty level than the unit sections having the lowest achievement difficulty level. In addition, an icon to be highlighted may be limited to an icon for a unit section having a bad previous evaluation.

As in the case of the evaluation indication system according to the above embodiments, a technique for acquiring an achievement difficulty level on the basis of results of fuel efficiency levels of a plurality of vehicles is also applicable to a program and a method. In addition, the above-described system, program and method may be implemented as a sole device, may be implemented as a plurality of devices or may be implemented by utilizing a component shared with various portions provided for a vehicle, and are implemented in various forms. For example, it is possible to provide a navigation system, a navigation method and a navigation program that are provided with the device as described above. In addition, the aspect of the present invention may be modified where appropriate, for example, a part of the aspect of the present invention is implemented as software and a part of the aspect of the present invention is implemented as hardware. Furthermore, the aspect of the present invention may include a storage medium that stores a program for controlling the system. The storage medium may be a magnetic storage medium, may be a magnetooptical storage medium or may be any storage media that will be developed in the future.

What is claimed is:

1. An evaluation indication system comprising:
   a guide control unit that displays a current location of a host vehicle together with a map around the current location on a display unit;
   a current evaluation acquisition unit that acquires a current evaluation that is an evaluation of a fuel efficiency level in a unit section of current travel of the host vehicle;
   a previous evaluation acquisition unit that acquires a previous evaluation that is an evaluation of the fuel efficiency level in the unit section of previous travel previous to the current travel; and
   an achievement difficulty level acquisition unit that acquires an achievement difficulty level of a target value of the fuel efficiency level, set on the basis of results of the fuel efficiency levels in the case where a plurality of vehicles have travelled the unit section, wherein
   the guide control unit indicates the achievement difficulty level together with the current evaluation and the previous evaluation on the map;
   the current evaluation is associated with a current evaluation icon;
   the previous evaluation is associated with a previous evaluation icon; and
   both the current evaluation icon and the previous evaluation icon are displayed on the map.

2. The evaluation indication system according to claim 1, wherein the achievement difficulty level acquisition unit acquires the achievement difficulty level that is set so as to increase as the number of vehicles of which the fuel efficiency level has not reached the target value among the plurality of vehicles increases.

3. The evaluation indication system according to claim 1, wherein the achievement difficulty level acquisition unit acquires the achievement difficulty level that is set so as to increase as a driving skill of a driver of each vehicle of which the fuel efficiency level has not reached the target value among the plurality of vehicles increases.

4. The evaluation indication system according to claim 1, wherein the guide control unit indicates the current evaluation icon and the previous evaluation icon in a mode corresponding to an evaluation and corresponding to the achievement difficulty level.

5. The evaluation indication system according to claim 1, further comprising:
   a recommended unit section acquisition unit that acquires a recommended unit section on the basis of the achievement difficulty level and the previous evaluation, wherein
   the guide control unit provides guidance on the recommended unit section.

6. The evaluation indication system according to claim 5, wherein the recommended unit section acquisition unit determines, on the basis of a driving skill of the driver of the host vehicle indicated by the previous evaluation, a unit section in which the driver of the host vehicle is to achieve the target value and acquires the determined unit section as the recommended unit section.

7. The evaluation indication system according to claim 5, wherein the guide control unit highlights the recommended unit section on the map.

8. The evaluation indication system according to claim 5, wherein:
   the guide control unit determines, on the basis of the corresponding previous evaluations, a rate of the unit sections in which the fuel efficiency level of the driver of the host vehicle has not reached the target value among the unit sections having the same achievement difficulty level; and
   the guide control unit sets, as the recommended unit sections, the unit sections having the lowest difficulty level among the achievement difficulty levels of which the determined rates are higher than or equal to a predetermined value.

9. An evaluation indication method comprising:
   displaying on a display a current location of a host vehicle and a map around the current location on a display unit;

acquiring a current evaluation that is an evaluation of a fuel efficiency level in a unit section of current travel of the host vehicle;

acquiring a previous evaluation that is an evaluation of the fuel efficiency level in the unit section of previous travel previous to the current travel;

acquiring an achievement difficulty level of a target value of the fuel efficiency level, set on the basis of results of the fuel efficiency levels in the case where a plurality of vehicles have travelled the unit section;

indicating the achievement difficulty level together with the current evaluation and the previous evaluation on the map on the display, associating the current evaluation with a current evaluation icon;

associating the previous evaluation with a previous evaluation icon; and displaying both the current evaluation icon and the previous evaluation icon on the map.

10. A non-transitory computer-readable storage medium that stores computer-executable instructions with a CPU for executing the instructions for performing an evaluation indication function comprising:

displaying a current location of a host vehicle and a map around the current location on a display unit;

acquiring a current evaluation that is an evaluation of a fuel efficiency level in a unit section of current travel of the host vehicle;

acquiring a previous evaluation that is an evaluation of the fuel efficiency level in the unit section of previous travel previous to the current travel;

acquiring an achievement difficulty level of a target value of the fuel efficiency level, set on the basis of results of the fuel efficiency levels in the case where a plurality of vehicles have travelled the unit section;

indicating the achievement difficulty level together with the current evaluation and the previous evaluation on the map, associating the current evaluation with a current evaluation icon;

associating the previous evaluation with a previous evaluation icon; and displaying both the current evaluation icon and the previous evaluation icon on the map.

11. An evaluation indication system for a path of travel from a departure place to a destination, the path of travel being divided into unit sections, the system comprising:

a guide control unit that displays a current location of a host vehicle together with a map around the current location on a display unit;

a current evaluation acquisition unit that acquires a current evaluation of a current fuel efficiency level in a unit section of current travel, the unit section of current travel having recently been traveled by the host vehicle from the departure point to the current location;

a previous evaluation acquisition unit that acquires a previous evaluation of a previous fuel efficiency level in a unit section of future travel, the previous fuel efficiency level being based on data acquired by the host vehicle traveling the same path of travel from the departure place to the destination in a previous trip; and an achievement difficulty level acquisition unit that acquires an achievement difficulty level of a target value of the previous fuel efficiency level, the achievement difficulty level being set on the basis of fuel efficiency levels determined by a plurality of vehicles that previously traveled the unit section having previous stored data, wherein the guide control unit indicates the achievement difficulty level together with the current evaluation and the previous evaluation on the map, the current evaluation is associated with a current evaluation icon;

the previous evaluation is associated with a previous evaluation icon; and both the current evaluation icon and the previous evaluation icon are displayed on the map.

* * * * *